US012658734B2

(12) United States Patent
Ding et al.

(10) Patent No.: US 12,658,734 B2
(45) Date of Patent: Jun. 16, 2026

(54) WIRELESS CHARGING SYSTEM AND WIRELESS CHARGING METHOD

(71) Applicant: HUAWEI TECHNOLOGIES CO., LTD., Shenzhen (CN)

(72) Inventors: Tao Ding, Dongguan (CN); Yongfa Zhu, Dongguan (CN); Zhensheng Chen, Dongguan (CN); Kaijun Liu, Tianjin (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 920 days.

(21) Appl. No.: 17/748,569

(22) Filed: May 19, 2022

(65) Prior Publication Data

US 2022/0278557 A1 Sep. 1, 2022
US 2023/0103280 A9 Mar. 30, 2023

Related U.S. Application Data

(63) Continuation of application No. PCT/CN2020/130596, filed on Nov. 20, 2020.

(30) Foreign Application Priority Data

Nov. 20, 2019 (CN) .......................... 201911143579.6

(51) Int. Cl.
*H02J 50/40* (2016.01)
*G06F 1/16* (2006.01)
(Continued)

(52) U.S. Cl.
CPC ............ *H02J 50/12* (2016.02); *G06F 1/1669* (2013.01); *H01F 38/14* (2013.01); *H02J 7/342* (2020.01);
(Continued)

(58) Field of Classification Search
CPC .. H02J 50/12; H02J 7/342; H02J 50/40; H02J 50/70; H02J 50/80; H02J 50/10;
(Continued)

(56) References Cited

U.S. PATENT DOCUMENTS

| | | | | |
|---|---|---|---|---|
| 11,133,696 B2 * | 9/2021 | Mehta | ................. | H01M 10/425 |
| 11,251,642 B2 * | 2/2022 | Harris | .................... | H02J 50/12 |

(Continued)

FOREIGN PATENT DOCUMENTS

| | | |
|---|---|---|
| CN | 202153662 U | 2/2012 |
| CN | 203225555 U | 10/2013 |

(Continued)

*Primary Examiner* — Nghia M Doan
(74) *Attorney, Agent, or Firm* — WOMBLE BOND DICKINSON (US) LLP

(57) ABSTRACT

Embodiments of this application disclose a wireless charging system. The wireless charging system includes a first electronic device, a wireless charging device, and a second electronic device. The wireless charging device is located between the first electronic device and the second electronic device. The wireless charging device is an auxiliary device of the first electronic device and is physically connected to the first electronic device, the wireless charging device includes a receiver circuit and a housing, the receiver circuit includes a receiver coil, and the receiver coil is located on an inner side of the housing. The first electronic device is configured to: charge the wireless charging device, charge the second electronic device through the wireless charging device, and receive power from the second electronic device through the wireless charging device.

20 Claims, 23 Drawing Sheets

(51) Int. Cl.

| | |
|---|---|
| *H01F 38/14* | (2006.01) |
| *H02J 7/34* | (2006.01) |
| *H02J 50/12* | (2016.01) |
| *H02J 50/70* | (2016.01) |
| *H02J 50/80* | (2016.01) |
| *G06F 3/023* | (2006.01) |

(52) U.S. Cl.
CPC .............. *H02J 50/40* (2016.02); *H02J 50/70* (2016.02); *H02J 50/80* (2016.02); *G06F 3/0231* (2013.01)

(58) Field of Classification Search
CPC .... H02J 50/005; G06F 1/1669; G06F 3/0231; G06F 1/1632; G06F 1/26; G06F 1/266; G06F 3/0202; G06F 1/1613; H01F 38/14; H01F 27/366; H04L 27/04; H04L 27/06
See application file for complete search history.

(56) References Cited

U.S. PATENT DOCUMENTS

| | | | | |
|---|---|---|---|---|
| 2014/0152114 A1* | 6/2014 | Kim | ........................ | H02J 50/12 |
| | | | | 307/104 |
| 2016/0094076 A1* | 3/2016 | Kasar | .................... | H02J 7/0042 |
| | | | | 320/103 |
| 2017/0201123 A1 | 7/2017 | Park | | |
| 2018/0198306 A1* | 7/2018 | Findley | ................... | G06F 1/263 |
| 2020/0227935 A1* | 7/2020 | Mehta | ..................... | H01F 38/14 |

FOREIGN PATENT DOCUMENTS

| | | |
|---|---|---|
| CN | 104362703 A | 2/2015 |
| CN | 104377741 A | 2/2015 |
| CN | 205945254 U | 2/2017 |
| CN | 107925258 A | 4/2018 |
| CN | 107947396 A | 4/2018 |
| CN | 207601747 U | 7/2018 |
| CN | 108885476 A | 11/2018 |
| CN | 208353009 U | 1/2019 |
| CN | 208548739 U | 2/2019 |
| CN | 109417309 A | 3/2019 |
| CN | 208571661 U | 3/2019 |
| CN | 208656473 U | 3/2019 |
| CN | 109742824 A | 5/2019 |
| CN | 208874364 U | 5/2019 |
| CN | 109888881 A | 6/2019 |
| CN | 110266118 A | 9/2019 |
| CN | 110769310 A | 2/2020 |
| CN | 210041439 U | 2/2020 |
| KR | 101237365 B1 | 2/2013 |
| KR | 20130118850 A | 10/2013 |
| KR | 20170107199 A | 9/2017 |

* cited by examiner

220

210

222
221
211
212

Magnetic material 2302

Coil 2301

Coil 2201

Magnetic material 2102

Coil 2101

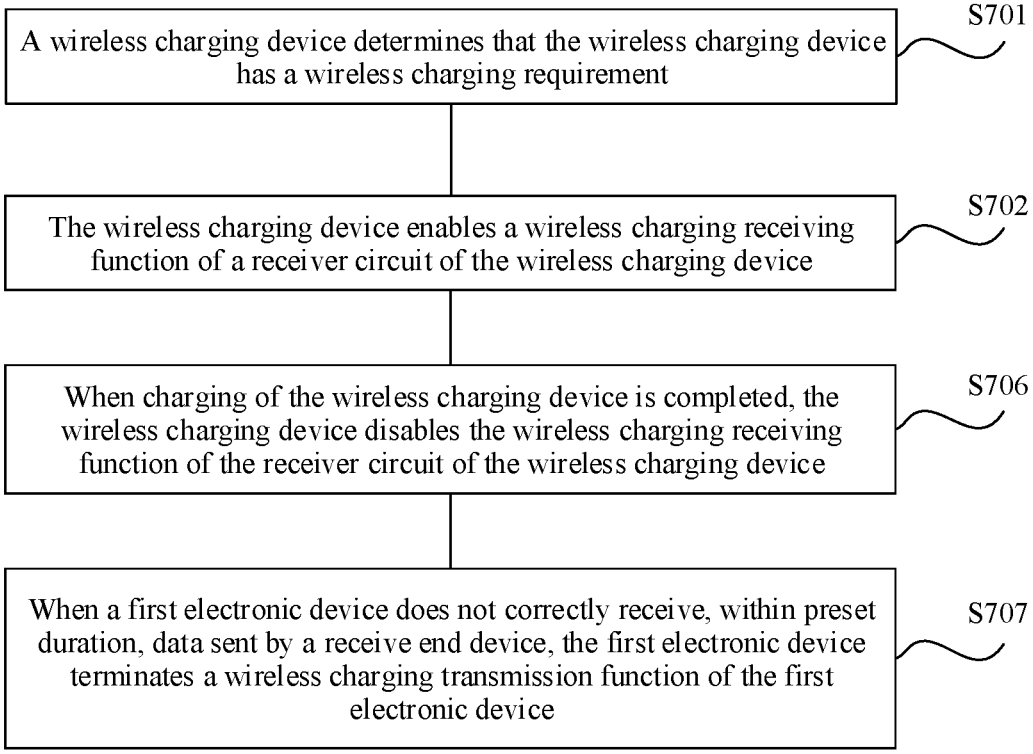

A wireless charging device determines that the wireless charging device has a wireless charging requirement ⟋⟍ S701

The wireless charging device enables a wireless charging receiving function of a receiver circuit of the wireless charging device ⟋⟍ S702

When charging of the wireless charging device is completed, the wireless charging device disables the wireless charging receiving function of the receiver circuit of the wireless charging device ⟋⟍ S706

When a first electronic device does not correctly receive, within preset duration, data sent by a receive end device, the first electronic device terminates a wireless charging transmission function of the first electronic device ⟋⟍ S707

FIG. 12

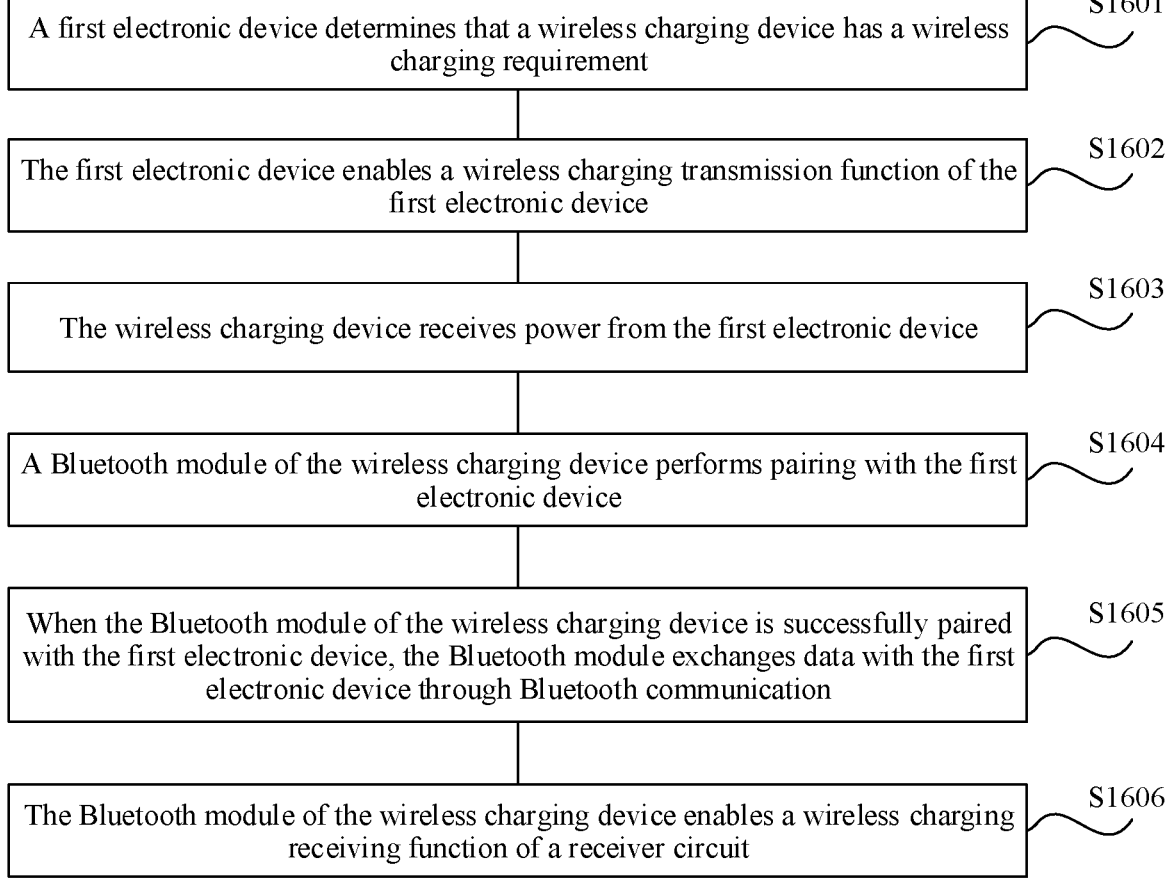

A first electronic device determines that a wireless charging device has a wireless charging requirement — S1601

The first electronic device enables a wireless charging transmission function of the first electronic device — S1602

The wireless charging device receives power from the first electronic device — S1603

A Bluetooth module of the wireless charging device performs pairing with the first electronic device — S1604

When the Bluetooth module of the wireless charging device is successfully paired with the first electronic device, the Bluetooth module exchanges data with the first electronic device through Bluetooth communication — S1605

The Bluetooth module of the wireless charging device enables a wireless charging receiving function of a receiver circuit — S1606

FIG. 16

WIRELESS CHARGING SYSTEM AND WIRELESS CHARGING METHOD

CROSS-REFERENCE TO RELATED APPLICATIONS

This application is a continuation of International Application No. PCT/CN2020/130596, filed on Nov. 20, 2020, which claims priority to Chinese Patent Application No. 201911143579.6, filed on Nov. 20, 2019. The disclosures of the aforementioned applications are hereby incorporated by reference in their entireties.

TECHNICAL FIELD

Embodiments of this application relate to the field of wireless charging technologies, and in particular, to a wireless charging system and a wireless charging method.

BACKGROUND

With wide application of mobile terminals, an increasing quantity of users attach importance to convenience and universality of charging of the mobile terminals. To facilitate charging by the users, a wireless charging technology emerges. To protect a housing of the mobile terminal or improve aesthetics, most users like to install an intelligent accessory (for example, a Bluetooth keyboard or a smart leather case) on the mobile terminal, so that user experience of the mobile terminal is further improved.

However, when both the mobile terminal and the intelligent accessory have a wireless charging capability, because a wireless charging system in a Qi standard supports only one-to-one communication, only one-to-one wireless power transmission can be implemented at a same moment. Therefore, when a wireless charging transmit device or a wireless charging receive device is replaced, one of the mobile terminal and the intelligent accessory usually needs to be detached, and then wireless charging pairing is performed again. For example, when the mobile terminal is provided with an intelligent accessory with a wireless charging function, the mobile terminal can receive wireless power from another electronic device or transmit wireless power to another electronic device only after the intelligent accessory is detached. However, detaching the intelligent accessory is usually very inconvenient, and user experience is poor.

SUMMARY

Embodiments of this application provide a wireless charging system and a wireless charging method, so that a first electronic device can forward receive wireless charging from another electronic device or reversely charge another electronic device without detaching an intelligent accessory, thereby improving user experience.

To achieve the foregoing objective, the following technical solutions are used in the embodiments of this application.

A first aspect of the embodiments of this application provides a wireless charging system. The wireless charging system includes a first electronic device, a wireless charging device, and a second electronic device. The wireless charging device is located between the first electronic device and the second electronic device. The wireless charging device is an auxiliary device of the first electronic device and is physically connected to the first electronic device, the wireless charging device includes a receiver circuit and a housing, the receiver circuit includes a receiver coil, and the receiver coil is located on an inner side of the housing. The first electronic device is configured to: charge the wireless charging device, charge the second electronic device through the wireless charging device, and receive power from the second electronic device through the wireless charging device. Based on this solution, the first electronic device charges the second electronic device through the wireless charging device, and receives the power from the second electronic device through the wireless charging device, so that the first electronic device can forward receive wireless charging from another electronic device or reversely charge another electronic device without detaching the wireless charging device from the first electronic device.

With reference to the first aspect, in an embodiment, when the first electronic device charges the second electronic device or receives the power from the second electronic device, an electromagnetic field between the first electronic device and the second electronic device penetrates the wireless charging device. Based on this solution, when wireless charging is performed between the first electronic device and the second electronic device, the electromagnetic field penetrates the wireless charging device between the first electronic device and the second electronic device, so that the first electronic device can charge the second electronic device through the wireless charging device, and receive the power from the second electronic device through the wireless charging device.

With reference to the first aspect and the foregoing embodiment, in another embodiment, there is no magnetic material between the receiver coil and the inner side of the housing, or an area of a magnetic material between the receiver coil and the inner side of the housing is less than a preset threshold. When the first electronic device charges the second electronic device or receives the power from the second electronic device, a wireless charging receiving function of the receiver circuit is in a disabled state. The wireless charging device is configured to: determine that the wireless charging device has a wireless charging requirement, and enable the wireless charging receiving function of the receiver circuit based on the wireless charging requirement. Based on this solution, when the first electronic device charges the second electronic device or receives the power from the second electronic device, the wireless charging receiving function of the receiver circuit of the wireless charging device is in a disabled state. Therefore, an ASK communication conflict does not occur between the wireless charging device and the second electronic device, and a misoperation of FOD protection is not caused. In addition, because there is no magnetic material on the receiver coil of the wireless charging device or the area of the magnetic material on the receiver coil of the wireless charging device is less than the preset threshold, the electromagnetic field between the first electronic device and the second electronic device can penetrate the wireless charging device, so that the first electronic device can charge the second electronic device through the wireless charging device, or receive the power from the second electronic device through the wireless charging device. It may be understood that, based on this solution, the first electronic device can charge the wireless charging device, and can also implement transparent transmission of wireless power when the first electronic device charges the second electronic device or receives the power from the second electronic device, so that the first electronic device can forward receive wireless charging from another electronic device or reversely charge another electronic device without detaching the wireless charging device from the first electronic device.

With reference to the first aspect and the foregoing embodiments, in another embodiment, the receiver circuit further includes an output switch and an ASK modulation circuit. That a wireless charging receiving function of the receiver circuit is in a disabled state includes: The output switch is in an opened state, and a modulation function of the ASK modulation circuit is in a disabled state. The wireless charging device is specifically configured to: enable the modulation function of the ASK modulation circuit, and close the output switch based on the wireless charging requirement. Based on this solution, when the first electronic device charges the second electronic device or receives the power from the second electronic device, the output switch is in an opened state, and the modulation function of the ASK modulation circuit is in a disabled state. Therefore, when the first electronic device forward receives wireless charging from another electronic device or reversely charges another electronic device, a loss of the wireless charging device is relatively small, and FOD protection and an ASK communication conflict are not caused. In addition, when (in some cases, only when) determining that the wireless charging device has a wireless charging requirement, the wireless charging device enables the modulation function of the ASK modulation circuit, and closes the output switch, so that the first electronic device can charge the wireless charging device.

With reference to the first aspect and the foregoing embodiments, in another embodiment, the wireless charging device is specifically configured to determine, according to an instruction entered by a user or detection information of a sensor, that the wireless charging device has a wireless charging requirement. Alternatively, the wireless charging device is further specifically configured to: receive first information from the first electronic device, and determine, based on the first information, that the wireless charging device has a wireless charging requirement. Based on this solution, it may be determined, according to the instruction entered by the user or the detection information of the sensor, that the wireless charging device has a charging requirement, or it may be determined, by receiving protocol data sent by the first electronic device, that the wireless charging device has a charging requirement.

With reference to the first aspect and the foregoing embodiments, in another embodiment, the wireless charging device is further configured to: when the charging of the wireless charging device is completed, send second information to the first electronic device, where the second information is used to indicate that the charging of the wireless charging device is completed. The wireless charging device is further configured to: when the charging of the wireless charging device is completed, disable the modulation function of the ASK modulation circuit, and open the output switch. Based on this solution, when the charging of the wireless charging device is completed, the wireless charging device may send, to the first electronic device, the second information indicating that the charging of the wireless charging device is completed, so that the first electronic device can disable a transmission function of the first electronic device. Alternatively, when the charging of the wireless charging device is completed, the wireless charging device may disable the modulation function of the ASK modulation circuit, and open the output switch, so that the first electronic device can disable a transmission function of the first electronic device when the first electronic device does not correctly receive, within preset duration, data sent by a receive end device.

With reference to the first aspect and the foregoing embodiments, in another embodiment, the receiver circuit further includes one or more first switches, a matching circuit, and a rectifier circuit. Two ends of the receiver coil are connected to an input end of the matching circuit, and an output end of the matching circuit is connected to an input end of the rectifier circuit. The one or more first switches are disposed between the receiver coil and the matching circuit or between the matching circuit and the input end of the rectifier circuit. Based on this solution, the first switch is disposed in the receiver circuit of the wireless charging device. Therefore, when the first electronic device forward receives wireless charging from another electronic device or reversely charges another electronic device, a loss of the wireless charging device can be further reduced, and a misoperation of FOD protection is less likely to be caused.

With reference to the first aspect and the foregoing embodiments, in another embodiment, the receiver circuit further includes an output switch and an ASK modulation circuit. That a wireless charging receiving function of the receiver circuit is in a disabled state includes: The one or more first switches are in an opened state. The wireless charging device is specifically configured to: close the one or more first switches, enable the modulation function of the ASK modulation circuit, and close the output switch based on the wireless charging requirement. Based on this solution, when the first electronic device charges the second electronic device or receives the power from the second electronic device, the first switch is in an opened state. Therefore, when the first electronic device forward receives wireless charging from another electronic device or reversely charges another electronic device, a loss of the wireless charging device is small enough, and FOD protection and an ASK communication conflict are not caused. In addition, when determining that the wireless charging device has a wireless charging requirement, the wireless charging device closes the first switch, enables the modulation function of the ASK modulation circuit, and closes the output switch, so that the first electronic device can charge the wireless charging device.

With reference to the first aspect and the foregoing embodiments, in another embodiment, the first switch is an active switch or a passive switch. Based on this solution, the first switch may be an active device such as a pair of back-to-back MOSFETs or electromagnetic relays, or may be a passive device such as a key or a reed.

With reference to the first aspect and the foregoing embodiments, in another embodiment, the wireless charging device is further configured to determine, according to an instruction entered by a user or detection information of a sensor, that the wireless charging device has a wireless charging requirement. Based on this solution, the wireless charging device may determine, according to the instruction entered by the user or the detection information of the sensor, that the wireless charging device has a wireless charging requirement.

With reference to the first aspect and the foregoing embodiments, in another embodiment, the wireless charging device is further configured to: when the charging of the wireless charging device is completed, send second information to the first electronic device, where the second information is used to indicate that the charging of the wireless charging device is completed. Alternatively, the wireless charging device is further configured to: when the charging of the wireless charging device is completed, open the first switch. Based on this solution, when the charging of the wireless charging device is completed, the wireless charging device may send, to the first electronic device, the second information indicating that the charging of the wireless charging device is completed, so that the first electronic device can disable a transmission function of the first electronic device. Alternatively, when the charging of the wireless charging device is completed, the wireless charging device may open the first switch, so that the first electronic device can disable a transmission function of the first electronic device when the first electronic device does not correctly receive, within preset duration, data sent by a receive end device.

With reference to the first aspect and the foregoing embodiments, in another embodiment, there is no magnetic material between the receiver coil and the inner side of the housing, or an area of a magnetic material between the receiver coil and the inner side of the housing is less than a preset threshold. The receiver circuit further includes a Bluetooth module. When the first electronic device charges the second electronic device or receives the power from the second electronic device, a wireless charging receiving function of the receiver circuit is in a disabled state. The wireless charging device is further configured to perform pairing with the first electronic device through the Bluetooth module. The wireless charging device is further configured to: when the Bluetooth module is successfully paired with the first electronic device, receive a first instruction from the first electronic device through the Bluetooth module, and enable the wireless charging receiving function of the receiver circuit through the Bluetooth module, where the first instruction is used to instruct to enable the wireless charging receiving function of the receiver circuit. Based on this solution, the wireless charging receiving function of the wireless charging device is enabled when the first electronic device is successfully paired with the Bluetooth module of the wireless charging device. However, when the first electronic device charges the second electronic device or receives the power from the second electronic device, the wireless charging receiving function of the receiver circuit is in a disabled state. Therefore, the receiver circuit of the wireless charging device does not output a current to a load, and the wireless charging device does not cause a misoperation of FOD protection. In addition, because there is no magnetic material on the receiver coil of the wireless charging device or the area of the magnetic material on the receiver coil of the wireless charging device is less than the preset threshold, the electromagnetic field between the first electronic device and the second electronic device can penetrate the wireless charging device, so that the first electronic device can charge the second electronic device through the wireless charging device, or receive the power from the second electronic device through the wireless charging device. It may be understood that the receiver circuit of the wireless charging device in this solution does not include an ASK modulation circuit. Therefore, when the first electronic device charges the second electronic device or receives the power from the second electronic device, an ASK communication conflict does not occur between the wireless charging device and the second electronic device.

With reference to the first aspect and the foregoing embodiments, in another embodiment, the receiver circuit further includes a rectifier circuit and a second switch. One end of the second switch is connected to an output end of the rectifier circuit, and the other end of the second switch is configured to connect to a load. That a wireless charging receiving function of the receiver circuit is in a disabled state includes: The second switch is in an opened state. The wireless charging device is specifically configured to close the second switch through the Bluetooth module. Based on this solution, when the first electronic device charges the second electronic device or receives the power from the second electronic device, the second switch of the wireless charging device is in an opened state. Therefore, the receiver circuit of the wireless charging device does not output a current to the load, and FOD protection and an ASK communication conflict are not caused. The first switch is closed when the first electronic device is successfully paired with the Bluetooth module of the wireless charging device, so that the first electronic device can wirelessly charge the wireless charging device. It may be understood that, based on this solution, the first electronic device can charge the wireless charging device, and can also implement transparent transmission of wireless power when the first electronic device charges the second electronic device or receives the power from the second electronic device, so that the first electronic device can forward receive wireless charging from another electronic device or reversely charge another electronic device without detaching the wireless charging device from the first electronic device.

With reference to the first aspect and the foregoing embodiments, in another embodiment, a self-resonant frequency of the wireless charging device is greater than a maximum working frequency at which the first electronic device charges the second electronic device or receives the power from the second electronic device. Based on this solution, transmission efficiency of wirelessly charging the second electronic device by the first electronic device can be improved, and a transmission distance and an offset capability can be increased.

With reference to the first aspect and the foregoing embodiments, in another embodiment, the wireless charging device is further configured to send a Bluetooth media access control MAC address to the first electronic device. Alternatively, the wireless charging device is further configured to receive a wireless fidelity Wi-Fi key or a Bluetooth MAC address from the first electronic device for pairing. Alternatively, the wireless charging device is further configured to: receive an operation instruction from the first electronic device, and perform an operation corresponding to the operation instruction. Based on this solution, after the first electronic device establishes wireless charging for the wireless charging device, an instruction and data may be transmitted between the first electronic device and the wireless charging device through in-band communication.

A second aspect of the embodiments of this application provides a wireless charging method, applied to a wireless charging system. The wireless charging system includes a first electronic device, a wireless charging device, and a second electronic device. The wireless charging device is located between the first electronic device and the second electronic device. The wireless charging device is an auxiliary device of the first electronic device and is physically connected to the first electronic device, the wireless charging device includes a receiver circuit and a housing, the receiver circuit includes a receiver coil, and the receiver coil is located on an inner side of the housing. The method includes: The first electronic device charges the second electronic device through the wireless charging device. Alternatively, the first electronic device receives power from the second electronic device through the wireless charging device.

With reference to the second aspect, in an embodiment, when the first electronic device charges the second electronic device or receives the power from the second electronic device, an electromagnetic field between the first electronic device and the second electronic device penetrates the wireless charging device.

With reference to the second aspect and the foregoing embodiment, in another embodiment, there is no magnetic material between the receiver coil and the inner side of the housing, or an area of a magnetic material between the receiver coil and the inner side of the housing is less than a preset threshold. When the first electronic device charges the second electronic device or receives the power from the second electronic device, a wireless charging receiving function of the receiver circuit is in a disabled state. The method further includes: The wireless charging device determines that the wireless charging device has a wireless charging requirement. The wireless charging device enables the wireless charging receiving function of the receiver circuit based on the wireless charging requirement.

With reference to the second aspect and the foregoing embodiments, in another embodiment, the receiver circuit further includes an output switch and an amplitude shift keying ASK modulation circuit. That a wireless charging receiving function of the receiver circuit is in a disabled state includes: The output switch is in an opened state, and a modulation function of the ASK modulation circuit is in a disabled state. That the wireless charging device enables the wireless charging receiving function of the receiver circuit includes: The wireless charging device enables the modulation function of the ASK modulation circuit, and closes the output switch.

With reference to the second aspect and the foregoing embodiments, in another embodiment, that the wireless charging device determines that the wireless charging device has a wireless charging requirement includes: The wireless charging device determines, according to an instruction entered by a user or detection information of a sensor, that the wireless charging device has a wireless charging requirement. Alternatively, the wireless charging device receives first information from the first electronic device, and determines, based on the first information, that the wireless charging device has a wireless charging requirement, where the first information is used to indicate that the wireless charging device has a wireless charging requirement.

With reference to the second aspect and the foregoing embodiments, in another embodiment, the method further includes: When the charging of the wireless charging device is completed, the wireless charging device sends second information to the first electronic device, where the second information is used to indicate that the charging of the wireless charging device is completed. Alternatively, when the charging of the wireless charging device is completed, the wireless charging device disables the modulation function of the ASK modulation circuit, and opens the output switch.

With reference to the second aspect and the foregoing embodiments, in another embodiment, the receiver circuit further includes one or more first switches, a matching circuit, and a rectifier circuit. Two ends of the receiver coil are connected to an input end of the matching circuit, and an output end of the matching circuit is connected to an input end of the rectifier circuit. The one or more first switches are disposed between the receiver coil and the matching circuit or between the matching circuit and the input end of the rectifier circuit.

With reference to the second aspect and the foregoing embodiments, in another embodiment, the receiver circuit further includes an output switch and an ASK modulation circuit. That a wireless charging receiving function of the receiver circuit is in a disabled state includes: The one or more first switches are in an opened state. That the wireless charging device enables the wireless charging receiving function of the receiver circuit includes: The wireless charging device closes the one or more first switches, enables the modulation function of the ASK modulation circuit, and closes the output switch.

With reference to the second aspect and the foregoing embodiments, in another embodiment, the first switch is an active switch or a passive switch.

With reference to the second aspect and the foregoing embodiments, in another embodiment, that the wireless charging device determines that the wireless charging device has a wireless charging requirement includes: The wireless charging device determines, according to an instruction entered by a user or detection information of a sensor, that the wireless charging device has a wireless charging requirement.

With reference to the second aspect and the foregoing embodiments, in another embodiment, the method further includes: When the charging of the wireless charging device is completed, the wireless charging device sends second information to the first electronic device, where the second information is used to indicate that the charging of the wireless charging device is completed. Alternatively, when the charging of the wireless charging device is completed, the wireless charging device opens the first switch.

With reference to the second aspect and the foregoing embodiments, in another embodiment, the receiver circuit further includes a Bluetooth module. There is no magnetic material between the receiver coil and the inner side of the housing, or an area of a magnetic material between the receiver coil and the inner side of the housing is less than a preset threshold. When the first electronic device charges the second electronic device or receives the power from the second electronic device, a wireless charging receiving function of the receiver circuit is in a disabled state. The method further includes: The wireless charging device performs pairing with the first electronic device through the Bluetooth module. When the Bluetooth module is successfully paired with the first electronic device, the wireless charging device receives a first instruction from the first electronic device through the Bluetooth module, and enables the wireless charging receiving function of the receiver circuit through the Bluetooth module, where the first instruction is used to instruct to enable the wireless charging receiving function of the receiver circuit.

With reference to the second aspect and the foregoing embodiments, in another embodiment, the receiver circuit further includes a rectifier circuit and a second switch. One end of the second switch is connected to an output end of the rectifier circuit, and the other end of the second switch is configured to connect to a load. That a wireless charging receiving function of the receiver circuit is in a disabled state includes: The second switch is in an opened state. That the wireless charging device enables the wireless charging receiving function of the receiver circuit through the Bluetooth module includes: The wireless charging device closes the second switch through the Bluetooth module.

With reference to the second aspect and the foregoing embodiments, in another embodiment, a self-resonant frequency of the wireless charging device is greater than a maximum working frequency at which the first electronic device charges the second electronic device or receives the power from the second electronic device.

A third aspect of the embodiments of this application provides a wireless charging method. The method includes: A first electronic device determines that a wireless charging device has a wireless charging requirement, and the first electronic device does not detect a second electronic device. The wireless charging device is an auxiliary device of the first electronic device and is physically connected to the first electronic device, the wireless charging device includes a receiver circuit and a housing, the receiver circuit includes a receiver coil, and the receiver coil is located on an inner side of the housing. The first electronic device sends first information to the wireless charging device, where the first information is used to indicate the wireless charging device to enable a wireless charging receiving function of the receiver circuit of the wireless charging device. Based on this solution, the first electronic device determines whether the wireless charging device has a wireless charging requirement. The first electronic device sends the first information to the wireless charging device when the first electronic device determines that the wireless charging device has a wireless charging requirement and the first electronic device does not detect another electronic device. After receiving the first information, the wireless charging device enables the wireless charging receiving function of the receiver circuit of the wireless charging device, thereby avoiding a problem that wireless charging is interrupted because the wireless charging device forcibly joins.

With reference to the third aspect, in an embodiment, that a first electronic device determines that a wireless charging device has a wireless charging requirement includes: The first electronic device determines, according to an instruction entered by a user or detection information of a sensor, that the wireless charging device has a wireless charging requirement. Based on this solution, the first electronic device may determine, according to the instruction entered by the user or the detection information of the sensor, that the wireless charging device has a wireless charging requirement.

With reference to the third aspect and the foregoing embodiment, in another embodiment, the method further includes: The first electronic device receives second information from the wireless charging device. The first electronic device terminates a wireless charging transmission function of the first electronic device based on the second information. The second information is used to indicate that charging of the wireless charging device is completed. Alternatively, when the first electronic device does not correctly receive, within preset duration, data sent by a receive end device, the first electronic device terminates a wireless charging transmission function of the first electronic device. The receive end device includes the wireless charging device. Based on this solution, after receiving the second information indicating that the charging of the wireless charging device is completed, the first electronic device disables the wireless charging transmission function of the first electronic device. Alternatively, when the first electronic device does not correctly receive, within the preset duration, the data sent by the receive end device, the first electronic device may disable the wireless charging transmission function of the first electronic device. Therefore, an unnecessary power loss and possible damage on the first electronic device are avoided.

A fourth aspect of the embodiments of this application provides an electronic device. The electronic device is a first electronic device. The first electronic device includes a controller, configured to: determine that a wireless charging device has a wireless charging requirement, and skip detecting a second electronic device. The wireless charging device is an auxiliary device of the first electronic device and is physically connected to the first electronic device, the wireless charging device includes a receiver circuit and a housing, the receiver circuit includes a receiver coil, and the receiver coil is located on an inner side of the housing. The controller is configured to send first information to the wireless charging device by using an FSK modulation method, where the first information is used to indicate the wireless charging device to enable a wireless charging receiving function of the receiver circuit of the wireless charging device.

With reference to the fourth aspect, in an embodiment, the controller is specifically configured to determine, according to an instruction entered by a user or detection information of a sensor, that the wireless charging device has a wireless charging requirement.

With reference to the fourth aspect and the foregoing embodiment, in another embodiment, the first electronic device further includes an ASK demodulation circuit. The controller is further configured to receive second information from the wireless charging device through the ASK demodulation circuit, where the second information is used to indicate that charging of the wireless charging device is completed. The controller is further configured to disable a wireless charging transmission function of the first electronic device based on the second information. Alternatively, the controller is further configured to: when data sent by a receive end device is not correctly received within preset duration, disable a wireless charging transmission function of the first electronic device. The receive end device includes the wireless charging device.

For descriptions of effects of the second aspect and the implementations of the second aspect, refer to descriptions of corresponding effects of the first aspect. For descriptions of effects of the fourth aspect and the implementations of the fourth aspect, refer to descriptions of corresponding effects of the third aspect.

A fifth aspect of the embodiments of this application provides a computer-readable storage medium. The computer-readable storage medium stores computer program code. When the computer program code is run on a processor, the processor is enabled to perform the wireless charging method in any one of the foregoing aspects.

A sixth aspect of the embodiments of this application provides a computer program product. The program product stores computer software instructions executed by a processor. The computer software instructions include a program used to perform the wireless charging method in any one of the foregoing aspects.

A seventh aspect of the embodiments of this application provides an apparatus. The apparatus exists in a product form of a chip. A structure of the apparatus includes a processor and a memory. The memory is configured to: be coupled to the processor, and store program instructions and data that are necessary for the apparatus. The processor is configured to execute the program instructions stored in the memory, so that the apparatus is enabled to perform the wireless charging method in any one of the foregoing aspects.

BRIEF DESCRIPTION OF DRAWINGS

FIG. 12 is a schematic flowchart of another wireless charging method according to an embodiment of this application;

FIG. 16 is a schematic flowchart of another wireless charging method according to an embodiment of this application;

DESCRIPTION OF EMBODIMENTS

Figure 1:
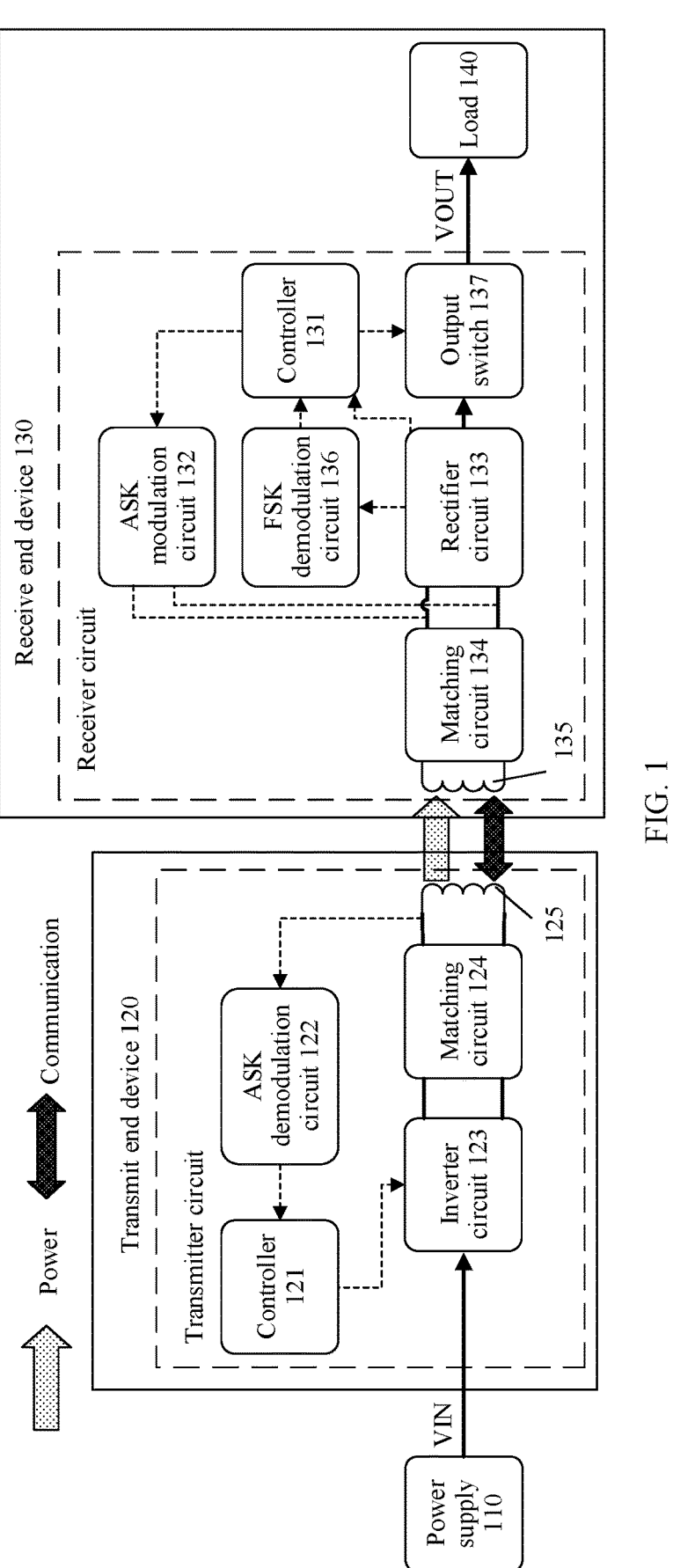
FIG. 1 is a schematic structural diagram of a wireless charging system according to an embodiment of this application.

The following describes the technical solutions in the embodiments of this application with reference to the accompanying drawings in the embodiments of this application. In this application, "at least one" means one or more, and "a plurality of" means two or more. The term "and/or"

describes an association relationship between associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one (piece) of the following" or a similar expression thereof means "any combination of the following", including "any combination of one or more of the following". For example, at least one (piece) of a, b, or c may represent: a, b, c, a and b, a and c, b and c, or a, b, and c, where a, b, and c may be singular or plural.

It should be noted that, in this application, the term "example" or "for example" is used to represent giving an example, an illustration, or a description. Any embodiment or design scheme described as an "example" or "for example" in this application should not be explained as being more preferred or having more advantages than another embodiment or design scheme. Exactly, use of the term such as "example" or "for example" is intended to present a relative concept in a specific manner.

Descriptions such as "first". "second" in the embodiments of this application are merely used for indicating and distinguishing between described objects, do not show a sequence, do not indicate a limitation on a quantity of devices in the embodiments of this application, and do not constitute any limitation on the embodiments of this application.

Terms used in the embodiments of this application are first explained.

Foreign object detection (FOD) means that a metal foreign object heats up during wireless charging because the metal foreign object is placed in the middle of a coil, and therefore an electric eddy current is generated. Foreign object detection may be determined by using a power difference method. When a difference between power of a transmit end and power of a receive end is relatively large, it may be determined that there is a metal foreign object. When a metal foreign object is detected. FOD protection may be performed to prevent a wireless charging receiver and a wireless charging transmitter from being damaged because the metal foreign object heats up during wireless charging. For example, during FOD protection, a power difference between a transmit end and a receive end may be calculated. When the difference exceeds a specific threshold (for example, 350 mW), the transmit end terminates wireless charging transmission, to prevent a metal foreign object from being overheated.

Amplitude shift keying (ASK) communication conflict means that in a wireless communications system, when a plurality of receive ends each transmit data to one transmit end through ASK, the plurality of pieces of data transmitted by the plurality of receive ends are superimposed, and consequently the transmit end cannot effectively read the data from the receive ends.

An embodiment of this application provides a wireless charging method. The wireless charging method may be applied to a wireless charging system shown in FIG. 1. As shown in FIG. 1, the wireless charging system includes a power supply 110, a transmit end device 120, and a receive end device 130. The transmit end device 120 includes a transmitter circuit, and the receive end device 130 includes a receiver circuit. The power supply 110 is configured to provide power to the transmitter circuit of the transmit end device 120. The transmitter circuit of the transmit end device 120 generates a high-frequency alternating magnetic field. The receiver circuit of the receive end device 130 senses the alternating magnetic field, converts magnetic energy into power, and provides the power to a load 140. The power supply 110 is generally provided by a direct current obtained by rectifying a battery or an alternating current mains. The load 140 may be a charging control chip of the receive end device 130, and may control power used for charging the battery or supplying power to the system.

For example, as shown in FIG. 1, the transmitter circuit of the transmit end device 120 may include a controller 121, an ASK demodulation circuit 122, an inverter circuit 123, a matching circuit 124, and a coil 125. The inverter circuit 123 is configured to: convert direct current power provided by the power supply 110 into alternating current power, and provide the alternating current power to the matching circuit 124 and the coil 125. The controller 121 executes an algorithm and a protocol related to wireless power transmission, to provide a drive signal and a communication signal modulated through frequency shift keying (FSK) to the inverter circuit 123, and reads, from the ASK demodulation circuit 122, communication information sent by the receive end device.

The receiver circuit of the receive end device 130 may include a controller 131, an ASK modulation circuit 132, a rectifier circuit 133, a matching circuit 134, a receiver coil 135, an FSK demodulation circuit 136, and an output switch 137. An alternating magnetic field generated by the coil 125 of the transmitter circuit is induced on the receiver coil 135 to generate an alternating current, and compensation is performed through the matching circuit 134, to improve transmission power and efficiency of the wireless charging system. The rectifier circuit 133 converts the alternating current power into direct current power, and provides the direct current power to the load 140 after the direct current power passes through the output switch 137. The controller 131 executes an algorithm and a protocol related to wireless power transmission, reads voltage information obtained through rectification, controls the output switch 137 to be closed or opened, reads, from the FSK demodulation circuit 136, information sent by the transmit end device, and sends data to the ASK modulation circuit 132.

It should be noted that the receiver circuit and the transmitter circuit in the wireless charging system shown in FIG. 1 may include more or fewer circuit modules than those shown in FIG. 1. A circuit structure of the transmitter circuit of the transmit end device and a circuit structure of the receiver circuit of the receive end device are not limited in this embodiment of this application. FIG. 1 is merely an example for description.

Figure 2:
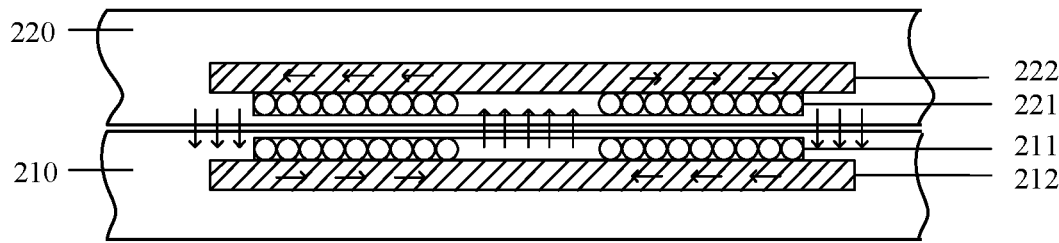
FIG. 2 is a schematic diagram of a wireless charging scenario according to an embodiment of this application.

FIG. 2 is a schematic diagram of coil stacking when the wireless charging system shown in FIG. 1 performs wireless charging. An electronic device 210 in FIG. 2 may be the transmit end device in FIG. 1, and an electronic device 220 in FIG. 2 may be the receive end device in FIG. 1.

For example, as shown in FIG. 2, the electronic device 210) includes a coil 211 and a magnetic material 212. When the electronic device 210 wirelessly charges the electronic device 220, the coil 211 is located on an inner side of a housing of the electronic device 210, and is disposed on one side close to the electronic device 220. The magnetic material 212 is disposed on the other side of the coil 211. The electronic device 220 includes a receiver coil 221 and a magnetic material 222. The receiver coil 221 is located on an inner side of a housing of the electronic device 220, and is disposed on one side close to the electronic device 210. The magnetic material 222 is disposed on the other side of the receiver coil 221. A part of a housing of an electronic device in a coil area is usually made of a non-conductive material and/or a non-conductive magnetic material. For example, the magnetic material may be a magnetic shielding sheet.

For example, the coil 211 and the receiver coil 221 may be planar coils, and are usually wound by using a single wire or a plurality of wires: or may be conductive patterns printed by using a flexible printed circuit board (FPC)/printed circuit board (PCB), and are usually circular or rectangular. The magnetic materials 212 and 222 may be materials with a high magnetic permeability, for example, ferrites and nanocrystals. A size of the magnetic material usually covers an area of the coil, to shield interference caused by a magnetic field to another circuit of the electronic device or prevent a metal from being heating up because a magnetic field generates an eddy current on the metal. The electronic device 210 and the electronic device 220 use centers of the two coils that are aligned as coordinates. Generally, wireless charging can still be performed provided that a distance between the coil 211 and the coil 221 is within 8 mm, and a horizontal offset between the coil 211 and the coil 221 is within 12 mm.

Figures 3A, 3B, 3C, 3D:
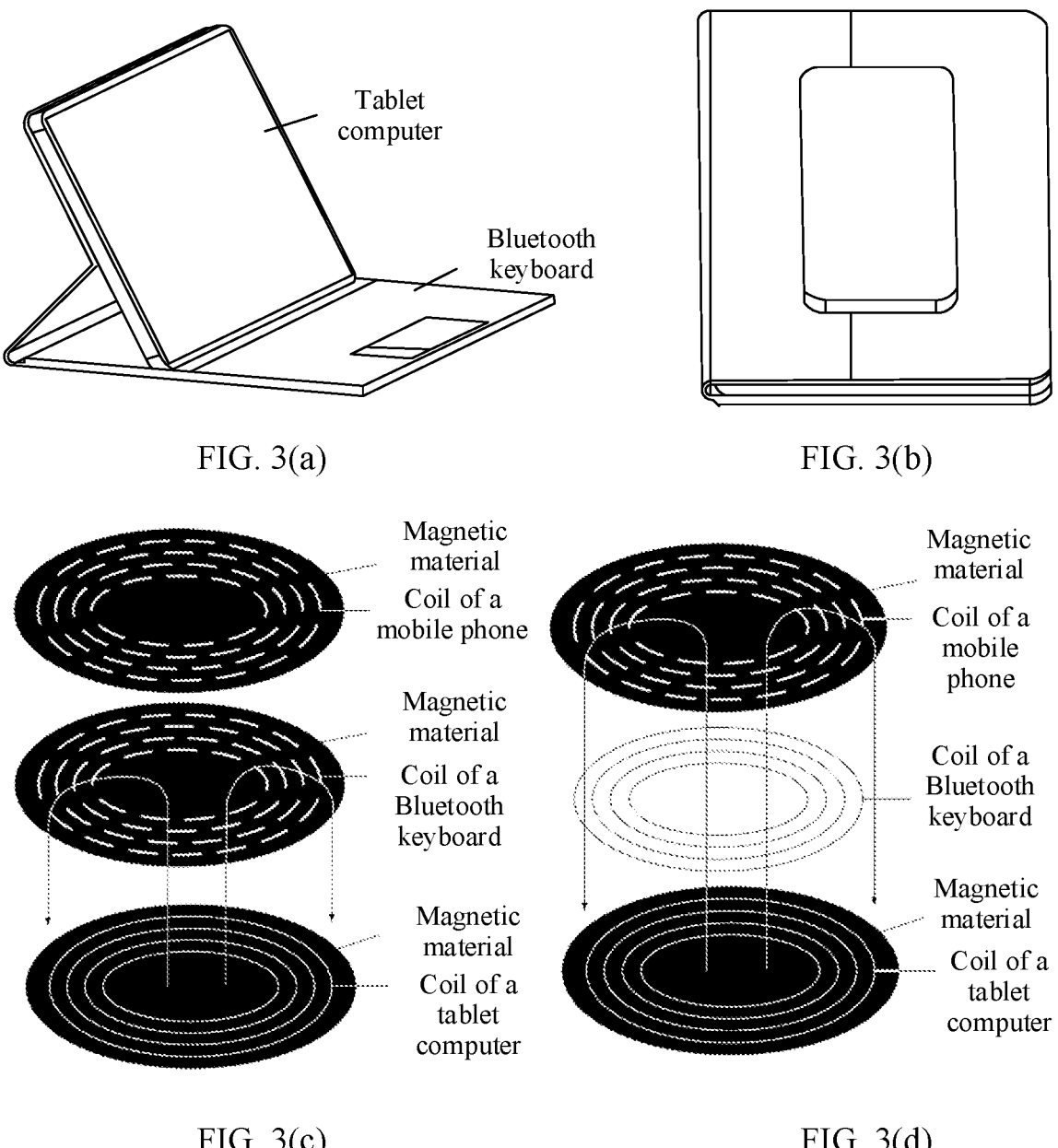
FIG. 3(a) to FIG. 3(d) are a schematic diagram of a scenario to which a wireless charging method is applied according to an embodiment of this application.

FIG. 3(*a*) to FIG. 3(*d*) are a schematic diagram of an application scenario of wireless charging. In this scenario, an auxiliary device supporting wireless charging is installed on a transmit end device, for example, an auxiliary device such as a Bluetooth keyboard or a smart leather case. As shown in FIG. 3(*a*), a tablet computer is provided with an auxiliary device, and the auxiliary device is a Bluetooth keyboard. The tablet computer may wirelessly charge the Bluetooth keyboard. In this case, the tablet computer is the transmit end device in FIG. 1, and the Bluetooth keyboard is the receive end device in FIG. 1. When the tablet computer is provided with a Bluetooth keyboard, and a wireless charging transmission function of the tablet computer is in an enabled state, a receiver circuit of the Bluetooth keyboard receives wireless power transmitted by the tablet computer, and the tablet computer charges the Bluetooth keyboard.

When the wireless charging transmission function of the tablet computer is in an enabled state, it is assumed that a user wants the tablet computer to charge another electronic device (for example, a mobile phone). In this case, as shown in FIG. 3(*b*), when the user places the mobile phone on the tablet computer (a coil of the Bluetooth keyboard is located between a coil of the tablet computer and a coil of the mobile phone), if there is a magnetic material on the coil of the Bluetooth keyboard, with reference to FIG. 3(*c*), electromagnetic induction occurs between the coil of the tablet computer and the coil of the Bluetooth keyboard, so that the tablet computer can charge the Bluetooth keyboard. Because there is the magnetic material on the coil of the Bluetooth keyboard, the wireless power transmitted by the tablet computer is between the coil of the tablet computer and the coil of the Bluetooth keyboard, and the coil of the mobile phone cannot induce the wireless power transmitted by the coil of the tablet computer. Therefore, the tablet cannot charge the mobile phone if the Bluetooth keyboard is not detached. If there is no magnetic material on the coil of the Bluetooth keyboard, with reference to FIG. 3(*d*), the wireless power transmitted by the coil of the tablet computer is transmitted to the coil of the mobile phone through the coil of the Bluetooth keyboard, that is, both the coil of the Bluetooth keyboard and the coil of the mobile phone can induce the power. However, when the Bluetooth keyboard and the mobile phone each send data to the tablet computer through ASK, the data sent by the Bluetooth keyboard and the data sent by the mobile phone are superimposed, and consequently the tablet computer cannot effectively read the data sent by the Bluetooth keyboard and the mobile phone.

In other words, an ASK communication conflict occurs between the Bluetooth keyboard and the mobile phone, and the tablet computer terminates the wireless transmission function of the tablet computer. In addition, when both the Bluetooth keyboard and the mobile phone receive the wireless power transmitted by the tablet computer. FOD protection is caused, and the tablet computer terminates the wireless charging transmission function. Therefore, when the tablet computer is provided with a Bluetooth keyboard, the tablet computer can charge the mobile phone or receive wireless power from another electronic device after the Bluetooth keyboard is detached from the tablet computer. In other words, when an electronic device is provided with an intelligent accessory with a wireless charging function, the electronic device can receive wireless power from another electronic device or transmit wireless power to another electronic device after the intelligent accessory is detached. However, detaching an intelligent accessory is usually very inconvenient, and user experience is poor.

To resolve a problem that user experience is poor because an intelligent accessory needs to be detached when a wireless charging transmit end device or a wireless charging receive end device is replaced, an embodiment of this application provides a wireless charging system. In the wireless charging system, an intelligent accessory does not need to be detached when a wireless charging transmit end device or a wireless charging receive end device is replaced, thereby improving user experience.

An embodiment of this application provides a wireless charging system. The wireless charging system includes a first electronic device, a wireless charging device, and a second electronic device. The wireless charging device is located between the first electronic device and the second electronic device. The wireless charging device is an auxiliary device of the first electronic device and is physically connected to the first electronic device, the wireless charging device includes a receiver circuit and a housing, the receiver circuit includes a receiver coil, and the receiver coil is located on an inner side of the housing of the wireless charging device. For example, a vertical distance between the receiver coil of the wireless charging device and a coil of the first electronic device is less than or equal to a first threshold (for example, 8 mm), and a horizontal offset between the receiver coil of the wireless charging device and the coil of the first electronic device is less than or equal to a second threshold (for example, 12 mm), to ensure that the receiver coil of the wireless charging device can induce wireless power transmitted by the coil of the first electronic device.

For example, the first electronic device and the second electronic device each may be s device such as a mobile phone, a smartphone, a tablet computer, a desktop computer, a laptop computer, a handheld computer, a notebook computer, a personal digital assistant (PDA), a video phone, an e-book reader, a moving picture experts group audio layer-3 (Moving Picture Experts Group Audio Layer III. MP3) player, the MP4 player, a handheld game console, or a digital camera. The wireless charging device is an auxiliary device of the first electronic device and is physically connected to the first electronic device, to provide more extended functions to the first electronic device. There is an application circuit that needs to consume power inside the wireless charging device. For example, the wireless charging device may be an auxiliary device such as a Bluetooth keyboard or a smart protective case that is used together with the first electronic device. Specific forms of the first electronic device, the second electronic device, and the wireless charging device are not particularly limited in this embodiment of this application.

For example, the first electronic device is configured to: charge the wireless charging device, charge the second electronic device through the wireless charging device, and receive power from the second electronic device through the wireless charging device. It may be understood that, when the first electronic device charges the wireless charging device, the second electronic device is relatively far away from the first electronic device, and cannot induce wireless power transmitted by the first electronic device. When the first electronic device charges the second electronic device or receives the power from the second electronic device, the wireless charging device is not charge, and the first electronic device may charge the second electronic device through the wireless charging device, or receive the power from the second electronic device through the wireless charging device.

It should be noted that, when the first electronic device charges the second electronic device or receives the power from the second electronic device, a vertical distance between a coil of the first electronic device and a coil of the second electronic device is less than or equal to a first threshold (for example, 8 mm), and a horizontal offset between the coil of the first electronic device and the coil of the second electronic device is less than or equal to a second threshold (for example, 12 mm), to ensure that the coil of the second electronic device can induce wireless power transmitted by the coil of the first electronic device.

When the first electronic device charges the second electronic device or receives the power from the second electronic device, an electromagnetic field between the first electronic device and the second electronic device may penetrate the wireless charging device.

For example, the receiver coil of the wireless charging device is configured to induce an external magnetic field and generate an induced current. In an implementation, there is no magnetic material between the receiver coil and the inner side of the housing of the wireless charging device. The housing of the wireless charging device may include a housing that is of the wireless charging device and that is close to the first electronic device, and/or a housing that is of the wireless charging device and that is away from the first electronic device. When there is no magnetic material between the receiver coil and the inner side of the housing of the wireless charging device, the electromagnetic field between the first electronic device and the second electronic device may penetrate the wireless charging device. The housing of the wireless charging device is made of a non-conductive material and/or a non-conductive magnetic material.

In another implementation, an area of a magnetic material between the receiver coil and the inner side of the housing of the wireless charging device is less than a preset threshold. The preset threshold can enable the electromagnetic field between the first electronic device and the second electronic device to penetrate the wireless charging device. In addition, power received by the second electronic device from the first electronic device can enable the second electronic device to be normally charged, and power received by the first electronic device from the second electronic device can also enable the first electronic device to be normally charged. In other words, when the area of the magnetic material between the receiver coil and the inner side of the housing of the wireless charging device is less than the preset threshold, the electromagnetic field between the first electronic device and the second electronic device is large enough to penetrate the wireless charging device, so that wireless charging between the first electronic device and the second electronic device can be normally performed. A specific value of the preset threshold is not limited in this embodiment of this application, provided that the electromagnetic field between the first electronic device and the second electronic device can penetrate the wireless charging device and the first electronic device and the second electronic device can be normally charged when the area of the magnetic material is less than the preset threshold.

In the following embodiments of this application, that there is no magnetic material between the receiver coil of the wireless charging device and the inner side of the housing of the wireless charging device is merely used as an example for description. For example, the receiver coil of the wireless charging device is a hollow coil, and there is no magnetic material on the hollow coil.

Figure 4:
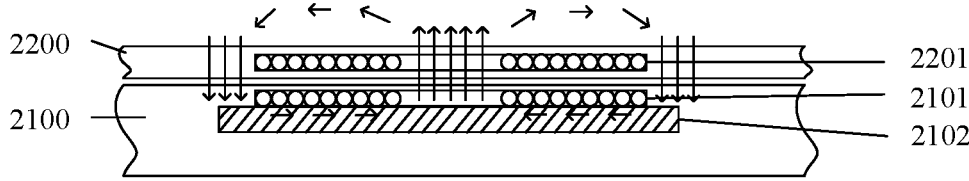
FIG. 4 is a schematic diagram of coil stacking in a wireless charging scenario according to an embodiment of this application.

For example, there is no magnetic material on the coil of the wireless charging device. FIG. 4 is a schematic diagram of coil stacking when the wireless charging system shown in FIG. 1 performs wireless charging. A first electronic device 2100 in FIG. 4 is a transmit end device, and a wireless charging device 2200 in FIG. 4 is an auxiliary device of the first electronic device 2100 and is physically connected to the first electronic device 2100. The first electronic device 2100 includes a coil 2101 and a magnetic material 2102, and the wireless charging device 2200 includes a receiver coil 2201. As shown in FIG. 4, there is the magnetic material 2102 on the coil 2101 of the first electronic device 2100, and there is no magnetic material on the receiver coil 2201 of the wireless charging device 2200. When the first electronic device 2100 wirelessly charges the wireless charging device 2200, an alternating magnetic field generated by the coil 2101 may be induced by the receiver coil 2201, and a receiver circuit of the wireless charging device 2200 may convert magnetic energy induced by the receiver coil 2201 into power, to supply power to a load of the wireless charging device 2200 or charge a battery of the wireless charging device 2200.

For example, in the wireless charging system provided in this embodiment of this application, when the first electronic device charges the second electronic device or receives the power from the second electronic device (that is, the second electronic device charges the first electronic device), a wireless charging receiving function of the receiver circuit of the wireless charging device is in a disabled state. For example, when the first electronic device charges the second electronic device or the second electronic device charges the first electronic device, a modulation function of an ASK modulation circuit of the receiver circuit of the wireless charging device is in a disabled state, and an output switch of the receiver circuit of the wireless charging device is in an opened state.

Figure 5:
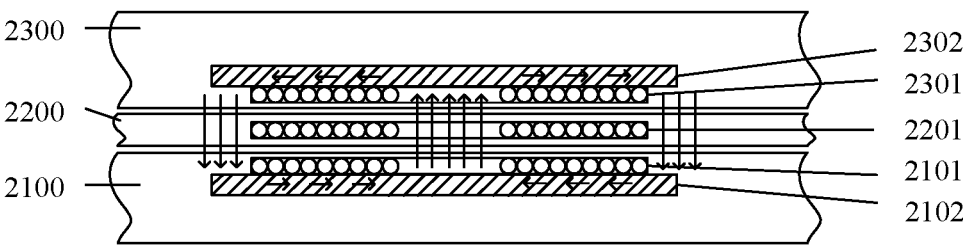
FIG. 5 is a schematic diagram of coil stacking in another wireless charging scenario according to an embodiment of this application.

For example, FIG. 5 is a schematic diagram of a wireless charging system according to an embodiment of this application. The wireless charging system includes a first electronic device 2100, a wireless charging device 2200, and a second electronic device 2300. The wireless charging device 2200 is an auxiliary device of the first electronic device 2100 and is physically connected to the first electronic device 2100. There is a magnetic material 2102 on a coil 2101 of the first electronic device 2100, there is no magnetic material on a coil 2201 of the wireless charging device 2200, and there is a magnetic material 2302 on a coil 2301 of the second electronic device 2300. With reference to the application scenario shown in FIG. 3(b), the first electronic device 2100 is a tablet computer, the wireless charging device 2200 is a Bluetooth keyboard that is installed on the tablet computer and that has a wireless charging function, and the second electronic device 2300 is a mobile phone. A scenario in which the tablet computer charges the mobile phone is used as an example.

As shown in FIG. 5, there is no magnetic material on the coil 2201 of the wireless charging device 2200) (Bluetooth keyboard). Therefore, wireless power transmitted by the coil 2101 of the first electronic device 2100 (tablet computer) can be transparently transmitted to the second electronic device 2300 (mobile phone) through the coil 2201 of the wireless charging device 2200 (Bluetooth keyboard), and the coil 2301 of the second electronic device 2300 (mobile phone) can induce the wireless power. Magnetic energy induced by the coil 2301 may be converted into power through a receiver circuit of the second electronic device 2300 (mobile phone). In other words, an electromagnetic field between the first electronic device 2100 (tablet computer) and the second electronic device 2300 (mobile phone) may penetrate the wireless charging device 2200 (Bluetooth keyboard).

In addition, when the first electronic device 2100 (tablet computer) charges the second electronic device 2300 (mobile phone), an output switch of a receiver circuit of the wireless charging device 2200 (Bluetooth keyboard) is in an opened state. Therefore, when the first electronic device 2100 (tablet computer) transparently transmits wireless power through the wireless charging device 2200 (Bluetooth keyboard), a loss of the wireless charging device 2200 (Bluetooth keyboard) is very small, and foreign object detection FOD protection is not caused. In addition, because a modulation function of an ASK modulation circuit of the receiver circuit of the wireless charging device 2200 (Bluetooth keyboard) is in a disabled state, an ASK communication conflict does not occur between the wireless charging device 2200 (Bluetooth keyboard) and the second electronic device 2300 (mobile phone). Therefore, the first electronic device 2100 (tablet computer) may wirelessly charge the second electronic device 2300 (mobile phone) without detaching the wireless charging device 2200 (Bluetooth keyboard). In other words, the first electronic device may charge the second electronic device through the wireless charging device. Correspondingly, the first electronic device may also receive the power from the second electronic device through the wireless charging device.

Figure 6:
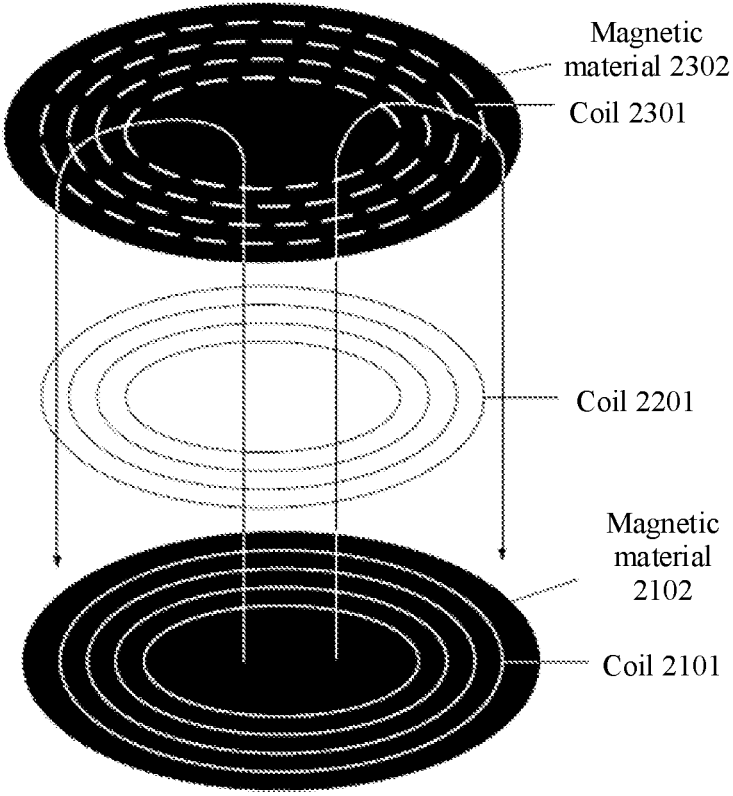
FIG. 6 is a schematic structural diagram of a coil in a wireless charging scenario according to an embodiment of this application.

FIG. 6 is a schematic structural diagram of a coil according to an embodiment of this application. As shown in FIG. 6, because there is no magnetic material on a coil 2201 of a wireless charging device 2200, wireless power transmitted by a coil 2101 of a first electronic device 2100 can be transmitted to a coil 2301 of a second electronic device 2300 through the coil 2201 of the wireless charging device 2200. In addition, when the first electronic device 2100 charges the second electronic device 2300, a wireless charging receiving function of a receiver circuit of the wireless charging device is in a disabled state. Therefore, in a scenario in which the first electronic device 2100 is provided with an auxiliary device (wireless charging device 2200) with a wireless charging function, the first electronic device 2100 can charge the second electronic device 2300 through the wireless charging device 2200, or receive wireless power from the second electronic device 2300 through the wireless charging device 2200 for charging, without causing FOD protection or an ASK communication conflict.

Figure 7:
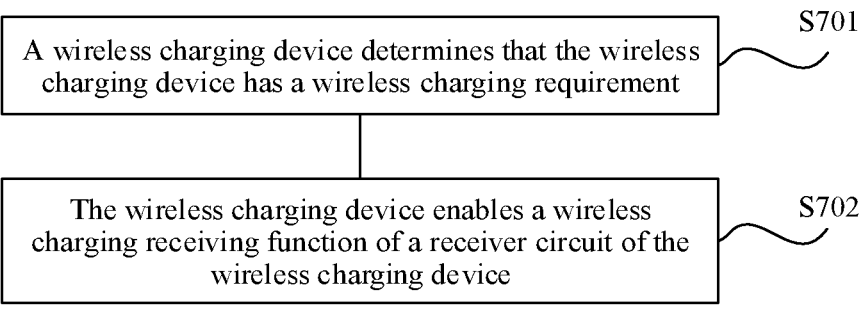
FIG. 7 is a schematic flowchart of a wireless charging method according to an embodiment of this application.

With reference to FIG. 3(a) to FIG. 3(d) to FIG. 6, as shown in FIG. 7, an embodiment of this application provides a wireless charging method. The wireless charging method is applied to a wireless charging system. The wireless charging system includes a first electronic device, a wireless charging device, and a second electronic device. The wireless charging device is located between the first electronic device and the second electronic device. The wireless charging device is an auxiliary device of the first electronic device and is physically connected to the first electronic device, the wireless charging device includes a receiver circuit and a housing, the receiver circuit includes a receiver coil, and the receiver coil is located on an inner side of the housing. There is no magnetic material on the receiver coil. The wireless charging device may be the wireless charging device 2200 shown in FIG. 4 to FIG. 6. When the first electronic device charges the second electronic device or the second electronic device charges the first electronic device, a wireless charging receiving function of the receiver circuit of the wireless charging device is in a disabled state. The method may include operations S701 and S702.

S701: The wireless charging device determines that the wireless charging device has a wireless charging requirement.

For example, that the wireless charging device determines that the wireless charging device has a wireless charging requirement may include: The wireless charging device determines, according to an instruction entered by a user or detection information of a sensor, that the wireless charging device has a wireless charging requirement. For example, the instruction entered by the user may be an instruction given by the user through a physical key, or an operation instruction set on an application (application. App) of the wireless charging device. The sensor may be a Hall effect sensor, an optical sensor, or the like. For example, a Hall effect sensor may be added on a side of a tablet computer attached to a Bluetooth keyboard. When the sensor detects that the Bluetooth keyboard is in a stand mode, it is determined that the Bluetooth keyboard has a wireless charging requirement.

For example, that the wireless charging device determines that the wireless charging device has a wireless charging requirement may further include: The wireless charging device receives first information from the first electronic device, and determines, based on the first information, that the wireless charging device has a wireless charging requirement. The first information may be protocol data that is agreed on, and is used to indicate that the wireless charging device has a wireless charging requirement. Optionally, in this implementation, before operation S701, when the first electronic device first determines that the wireless charging device has a wireless charging requirement, and the first electronic device does not detect another electronic device, the first electronic device sends protocol data that is agreed on to the wireless charging device, to indicate the wireless charging device to enable the wireless charging receiving function of the receiver circuit of the wireless charging device.

It may be understood that a specific manner in which the wireless charging device determines that the wireless charging device has a wireless charging requirement is not limited in this embodiment of this application, and is merely an example for description herein.

Figure 8:
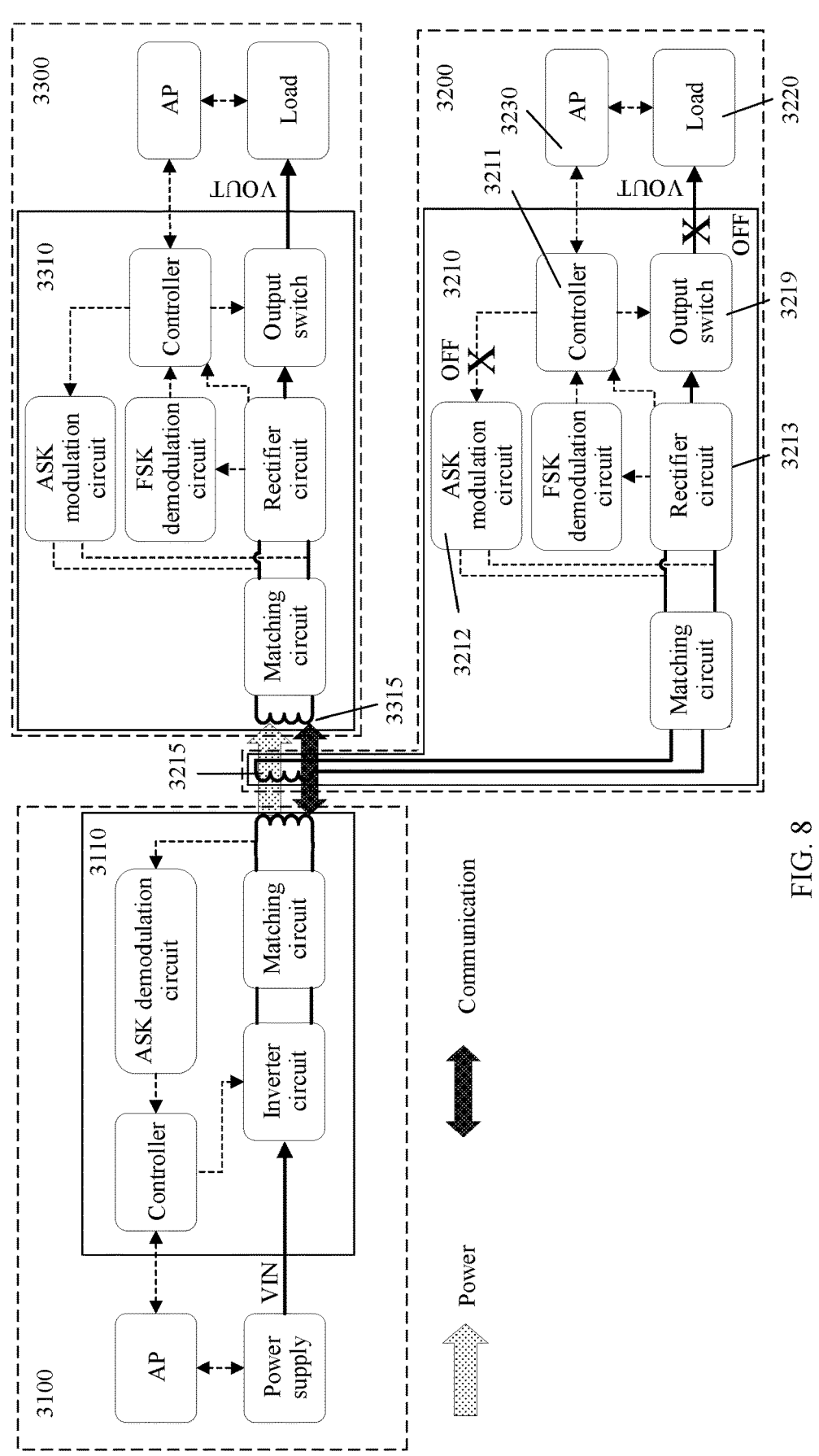
FIG. 8 is a schematic structural diagram of a wireless charging system according to an embodiment of this application.

In an implementation, a wireless charging system shown in FIG. 8 includes a first electronic device 3100, a wireless charging device 3200, and a second electronic device 3300. The wireless charging device 3200 is located between the first electronic device 3100 and the second electronic device 3300. The wireless charging device 3200 is an auxiliary device of the first electronic device 3100 and is physically connected to the first electronic device 3100. There is no magnetic material on a coil 3215 of the wireless charging device 3200. A receiver circuit 3210 of the wireless charging device 3200 includes an ASK modulation circuit 3212 and an output switch 3219. With reference to FIG. 8, that a wireless charging receiving function of the receiver circuit of the wireless charging device is in a disabled state includes: The output switch 3219 of the wireless charging device 3200 in FIG. 8 is in an opened state, and a modulation function of the ASK modulation circuit 3212 of the wireless charging device 3200 in FIG. 8 is in a disabled state.

For example, as shown in FIG. 8, because there is no magnetic material on the coil 3215 of the wireless charging device 3200, wireless power transmitted by the first electronic device 3100 can be transparently transmitted to a coil 3315 of the second electronic device 3300 through the coil 3215 of the wireless charging device 3200. In addition, when the first electronic device 3100 charges the second electronic device 3300, the output switch 3219 of the wireless charging device 3200 is in an opened state, and the modulation function of the ASK modulation circuit 3212 of the wireless charging device 3200 is in a disabled state. Therefore, when the first electronic device 3100 charges the second electronic device 3300, although the coil 3215 of the wireless charging device 3200 can induce the wireless power, the output switch 3219 of the receiver circuit 3210 of the wireless charging device 3200 is in an opened state. Therefore, no current is output to a load, and a controller 3211 and a rectifier circuit 3213 of the wireless charging device 3200 have relatively low power consumption (less than 100 mW). The power consumption does not cause FOD protection. In addition, because the modulation function of the ASK modulation circuit 3212 is in a disabled state, an ASK communication conflict does not occur between the wireless charging device 3200 and the second electronic device 3300. That is, when the first electronic device 3100 charges the second electronic device 3300, the wireless power transmitted by the first electronic device can be transparently transmitted to the second electronic device through the coil of the wireless charging device, without causing a misoperation of FOD protection or an ASK communication conflict. In other words, the first electronic device 3100 may charge the second electronic device 3300 through the wireless charging device 3200. Therefore, when the first electronic device 3100 wirelessly charges the second electronic device 3300, the first electronic device can charge the second electronic device through the wireless charging device, or receive power from the second electronic device through the wireless charging device, without detaching the wireless charging device 3200 from the first electronic device 3100.

Figure 8A:
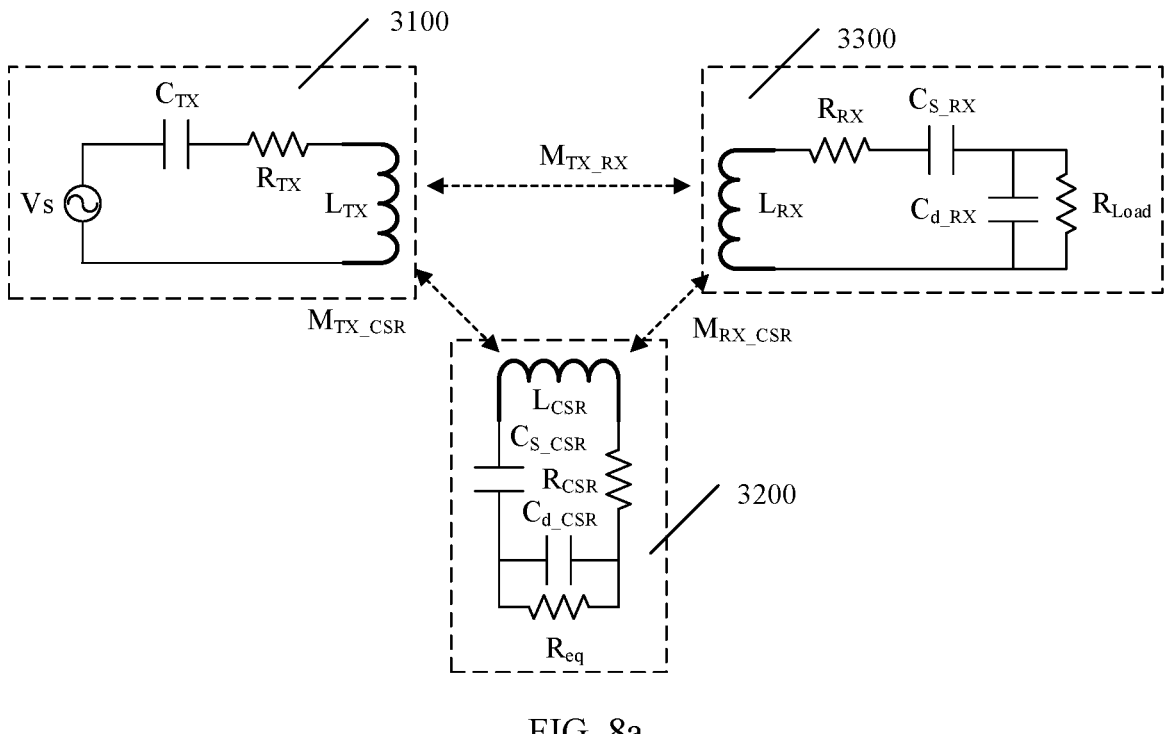
FIG. 8a is a schematic structural diagram of another wireless charging system according to an embodiment of this application.

For example, with reference to FIG. 8, when the first electronic device 3100 wirelessly charges the second electronic device 3300 or the second electronic device 3300 or the wireless charging device wirelessly charges the first electronic device 3100, the entire wireless charging system may be equivalently simplified as that shown in FIG. 8a.

That the first electronic device 3100 wirelessly charges the second electronic device 3300 is used as an example. As shown in FIG. 8a, a transmitter circuit 3110 of the first electronic device 3100 may be equivalent to a high-frequency alternating current power supply Vs, a resonant capacitor $C_{TX}$, a coil $L_{TX}$, and an equivalent resistor $R_{TX}$ on a through-current path. A receiver circuit 3310 of the second electronic device 3300 may be equivalent to a load $R_{Load}$, a series resonant capacitor $C_{S\_RX}$, a series resonant capacitor $C_{d\_RX}$, a receiver coil $L_{RX}$, and an equivalent resistor $R_{RX}$ on a through-current path. The receiver circuit 3210 of the wireless charging device 3200 may be equivalent to a load Req, a series resonant capacitor $C_{S\_CSR}$, a series resonant capacitor $C_{d\_CSR}$, a receiver coil $L_{CSR}$, and an equivalent resistor $R_{CSR}$ on a through-current path. $M_{TX\_RX}$ is a mutual inductance between the coil $L_{TX}$ and the receiver coil $L_{RX}$, $M_{TX\_CSR}$ is a mutual inductance between the coil $L_{TX}$ and the receiver coil $L_{CSR}$, and $M_{RX\_CSR}$ is a mutual inductance between the receiver coil $L_{RX}$ and the receiver coil $L_{CSR}$. When the first electronic device 3100 wirelessly charges the second electronic device 3300, a wireless charging receiving function of the receiver circuit 3210 of the wireless charging device 3200 is in a disabled state. Therefore, a resistance value of $R_{eq}$ is very large, and impact of the resistance value of $R_{eq}$ on self-resonant frequencies $f_{CSR}$ of the coil and the capacitor of the wireless charging device 3200 may be ignored. A self-resonant frequency of the wireless charging device 3200 may be calculated as follows:

$$f_{CSR} = \frac{1}{2\pi\sqrt{L_{CSR} \times \dfrac{C_{S\_CSR} \times C_{d\_CSR}}{C_{S\_CSR} + C_{d\_CSR}}}}$$

When a working frequency $f_{op}$ at which the first electronic device 3100 wirelessly charges the second electronic device 3300 is less than $f_{CSR}$, a current induced on the receiver coil $L_{CSR}$ of the wireless charging device 3200 is ahead of a current on the coil $L_{TX}$ by a phase angle (0) to 90 degrees). The receiver coil $L_{CSR}$ of the wireless charging device 3200 may function as a wireless charging relay, to improve transmission efficiency of wirelessly charging the second electronic device 3300 by the first electronic device 3100. Therefore, appropriate parameters may be selected for $L_{CSR}$, $C_{S\_CSR}$, and $C_{d\_CSR}$ of the wireless charging device 3200, so that $f_{CSR}$ can be greater than a maximum working frequency $f_{op\_max}$ at which the first electronic device 3100 wirelessly charges the second electronic device 3300. Therefore, charging efficiency can be improved, and a transmission distance and an offset capability can be increased.

Figure 9:
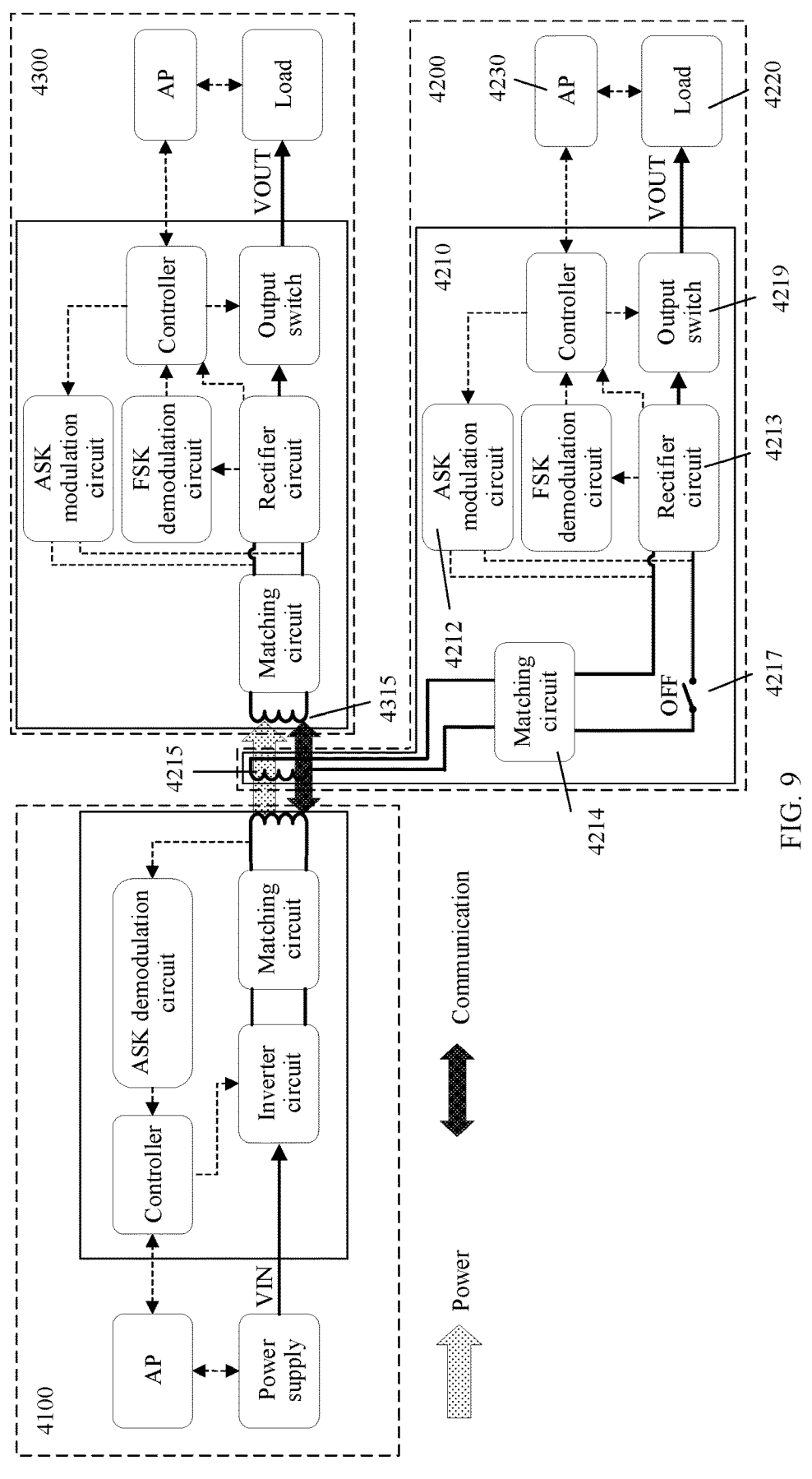
FIG. 9 is a schematic structural diagram of another wireless charging system according to an embodiment of this application.

In another implementation, a wireless charging system shown in FIG. 9 includes a first electronic device 4100, a wireless charging device 4200, and a second electronic device 4300. The wireless charging device 4200 is located between the first electronic device 4100 and the second electronic device 4300. The wireless charging device 4200 is an auxiliary device of the first electronic device 4100 and is physically connected to the first electronic device 4100. There is no magnetic material on a coil 4215 of the wireless charging device 4200. A receiver circuit 4210 of the wireless charging device 4200 includes an ASK modulation circuit 4212 and an output switch 4219. The receiver circuit 4210 further includes one or more first switches 4217, a matching circuit 4214, and a rectifier circuit 4213. Two ends of the coil 4215 are connected to an input end of the matching circuit 4214, and an output end of the matching circuit 4214 is connected to an input end of the rectifier circuit 4213. The one or more first switches 4217 are disposed between the coil 4215 and the matching circuit 4214 or between the matching circuit 4214 and the input end of the rectifier circuit 4213. In FIG. 9, an example in which there is one first switch, and the first switch 4217 is disposed between the matching circuit 4214 and the input end of the rectifier circuit 4213 is merely used for illustration. With reference to FIG. 9, that a wireless charging receiving function of the receiver circuit of the wireless charging device is in a disabled state includes: The first switch 4217 in FIG. 9 is in an opened state.

For example, as shown in FIG. 9, because there is no magnetic material on the coil 4215 of the wireless charging device 4200, wireless power transmitted by the first electronic device 4100 can be transparently transmitted to a coil 4315 of the second electronic device 4300 through the coil 4215 of the wireless charging device 4200. In addition, when the first electronic device 4100 charges the second electronic device 4300, the first switch 4217 of the wireless charging device 4200 is in an opened state. Therefore, when the first electronic device 4100 charges the second electronic device 4300, although the coil 4215 of the wireless charging device 4200 can induce the wireless power, the first switch 4217 of the receiver circuit 4210 of the first electronic device 4100 is in an opened state. Therefore, the rectifier circuit 4213 of the wireless charging device 4200 cannot receive the power and cannot provide the power to a load. Therefore, power consumed by the receiver circuit 4210 of the wireless charging device 4200 is low (<10 mW), and a misoperation of FOD protection is not caused. Therefore, normal running of the first electronic device 4100 is not affected. In addition, because the first switch 4217 is in an opened state, an ASK modulation function of the ASK modulation circuit 4212 cannot be enabled. Therefore, an ASK communication conflict does not occur between the wireless charging device 4200 and the second electronic device 4300. That is, when the first electronic device 4100 charges the second electronic device 4300, the wireless power transmitted by the first electronic device 4100 can be transparently transmitted to the second electronic device 4300 through the coil 4215 of the wireless charging device 4200, without causing a misoperation of FOD protection or an ASK communication conflict. In other words, the first electronic device 4100 may charge the second electronic device 4300 through the wireless charging device 4200. Therefore, when the first electronic device 4100 wirelessly charges the second electronic device 4300, the first electronic device can charge the second electronic device through the wireless charging device, or receive power from the second electronic device through the wireless charging device, without detaching the wireless charging device 4200 from the first electronic device 4100.

It should be noted that, a difference between the implementation shown in FIG. 9 and the implementation shown in FIG. 8 lies in that the first switch is added between the matching circuit 4214 and the rectifier circuit 4213 of the receiver circuit 4210 of the wireless charging device 4200 shown in FIG. 9. When the first electronic device 4100 wirelessly charges the second electronic device 4300, the first switch 4217 of the receiver circuit 4210 of the wireless charging device 4200 is disconnected from the coil 4215. Therefore, a loss of the wireless charging device 4200 is smaller than that of the wireless charging device 3200 shown in FIG. 8, and a misoperation of FOD protection is less likely to be caused.

For example, the first switch in FIG. 9 may be an active switch or a passive switch. For example, the first switch may be an active device such as a pair of back-to-back MOSFETs or electromagnetic relays. For another example, the first switch may be a passive device such as a key or a reed. A form of the first switch is not limited in this embodiment of this application.

S702: The wireless charging device enables the wireless charging receiving function of the receiver circuit of the wireless charging device based on the wireless charging requirement.

For example, when the wireless charging device determines that the wireless charging device has a wireless charging requirement, the wireless charging device enables the wireless charging receiving function of the receiver circuit of the wireless charging device, receives the wireless power from the first electronic device, and provides the wireless power to the load.

In an implementation, with reference to FIG. 8, in operation S701, when the wireless charging device determines that the wireless charging device has a wireless charging requirement, that the wireless charging device enables the wireless charging receiving function of the receiver circuit of the wireless charging device includes: The controller 3211 and/or an AP 3230) receive/receives an instruction, enable/enables the modulation function of the ASK modulation circuit 3212, and close/closes the output switch 3219, to provide the power to a load 3220.

For example, with reference to FIG. 8, when the wireless charging device 3200 determines that the wireless charging device 3200 has a wireless charging requirement, the controller 3211 and/or the AP 3230) of the second electronic device enable/enables the modulation function of the ASK modulation circuit 3212, returns data such as configuration information to the first electronic device 3100, close/closes the output switch 3219, to output the power to the load 3220.

It should be noted that, when the wireless charging device 3200 has a battery or another energy storage device (for example, an ultra-capacitor), before the output switch 3219 of the wireless charging device 3200 is closed, the AP 3230 may be powered by the battery or the another energy storage device, and the controller 3211 is powered by an output of the rectifier circuit 3213. Therefore, the wireless charging requirement may be transmitted to the controller 3211 and/or the AP 3230, and the controller 3211 and/or the AP 3230) enable/enables the modulation function of the ASK modulation circuit 3212, and close/closes the output switch 3219. When the wireless charging device 3200 has no battery or energy storage device, before the output switch 3219 of the wireless charging device 3200 is closed, the AP 3230 cannot work because there is no power supply, and the controller 3211 may be powered by an output of the rectifier circuit 3213. Therefore, the wireless charging requirement may be transmitted to the controller 3211, and the controller 3211 enables the modulation function of the ASK modulation circuit 3212, and closes the output switch 3219.

In another implementation, with reference to FIG. 9, in operation S701, when the wireless charging device determines that the wireless charging device has a wireless charging requirement, that the wireless charging device enables the wireless charging receiving function of the receiver circuit of the wireless charging device includes: closing the first switch 4217, enabling the modulation function of the ASK modulation circuit 4212, and closing the output switch 4219, to provide the power to a load 4220.

For example, when the first switch 4217 is a key, the user may tap the key of the first switch 4217 to close the first switch. When the first switch 4217 is a reed switch, a magnet close to the first electronic device or another device that generates a magnetic field strength may trigger the reed switch to be closed.

For example, when the first switch 4217 is an active device, and a drive circuit of the first switch 4217 is powered by an internal battery or another energy storage device of the wireless charging device 4200, the first switch 4217 may directly receive the instruction entered by the user or the detection information of the sensor, to control a status of the first switch 4217. Alternatively, after a user requirement is transmitted to an AP 4230, the AP 4230 controls a status of the first switch 4217. If the wireless charging device 4200 has no internal battery or another energy storage device, or a power level of an internal battery or another energy storage device of the wireless charging device 4200 is extremely low; the drive circuit of the first switch 4217 cannot be closed because there is no power supply. Consequently, the wireless charging receiving function of the receiver circuit 4210 cannot be enabled. Therefore, to avoid the foregoing problem, the drive circuit of the first switch 4217 may be powered by the coil 4215 after a single rectifier circuit obtains direct current power through rectification.

Figure 10:
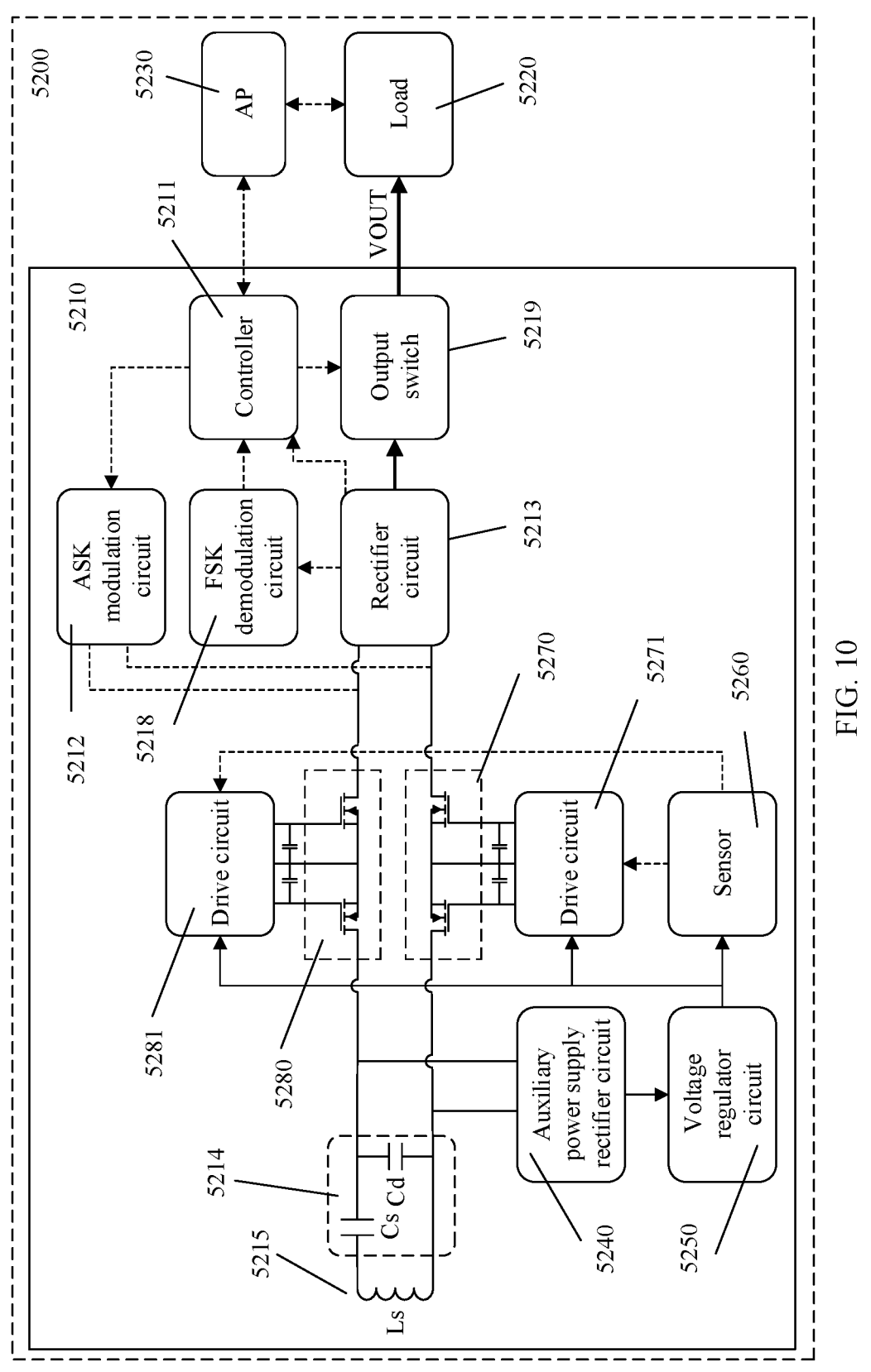
FIG. 10 is a schematic structural diagram of another wireless charging system according to an embodiment of this application.

For example, an example in which the first switch includes a first power switch and a second power switch, and the first power switch and the second power switch are controlled by two drive circuits is used. As shown in FIG. 10, a second electronic device 5200 includes a receiver circuit 5210, a load 5220, and an AP 5230. The receiver circuit 5210) includes a controller 5211, an ASK modulation circuit 5212, a rectifier circuit 5213, a matching circuit 5214, a hollow coil 5215, an FSK demodulation circuit 5218, an output switch 5219, an auxiliary power rectifier circuit 5240, a voltage regulator circuit 5250), a sensor 5260, a first power switch 5270 and a first drive circuit 5271 thereof, and a second power switch 5280 and a second drive circuit 5281 thereof.

As shown in FIG. 10, the matching circuit 5214 is formed by capacitors that are connected in series and in parallel. A first end of a capacitor Cs is connected to a first end of the hollow coil 5215, a first end of a capacitor Cd is connected to a second end of the hollow coil, and a second end of Cd is connected to a second end of Cs. A second end of Cs is further connected to a first end of the second power switch 5280, and the first end of Cd is connected to a first end of the first power switch 5270). A second end of the first power switch 5270 is connected to one input end of the rectifier circuit 5213, and the first power switch 5270 is controlled by the drive circuit 5271. A second end of the second power switch 5280 is connected to the other input end of the rectifier circuit 5213, and the second power switch 5280 is controlled by the drive circuit 5281. The drive circuit 5271 and the drive circuit 5281 are controlled by the sensor 5260. The drive circuit 5271, the drive circuit 5281, and the sensor 5260 are powered by the voltage regulator circuit 5250) (and/or an internal battery of the wireless charging device, which is not shown in FIG. 10). The voltage regulator circuit 5250 is powered by the auxiliary power rectifier circuit 5240. The auxiliary power rectifier circuit 5240) converts an alternating current induced on the hollow coil 5215 into a direct current, to supply power to the drive circuit 5271, so that when the second electronic device has no internal battery or another energy storage device, or a power level of an internal battery or another energy storage device is extremely low; the drive circuit of the first switch can be powered after a single rectifier circuit performs rectification, thereby avoiding a problem that the wireless charging receiving function of the receiver circuit 5210) cannot be enabled because the drive circuit of the first switch cannot be closed due to no power supply.

Optionally, the wireless charging device may further include a function module that can perform near field communication with the first electronic device, for example, a Bluetooth module, a wireless fidelity (Wi-Fi) module, or a near field communication (NFC) module, to enable a smart feature of the wireless charging device (for example, key-board input, screen content display, and automatic startup of the first electronic device to charge the wireless charging device when a battery level of the wireless charging device is low). A specific module included in the wireless charging device is not limited in this embodiment of this application. FIG. 8. FIG. 9, and FIG. 10 are merely examples for description. In actual application, the wireless charging device may include more or fewer circuit modules than those shown in FIG. 8. FIG. 9, and FIG. 10.

For example, after the first electronic device establishes wireless charging for the wireless charging device, in addition to a control protocol and data, a control instruction and data required by another wireless charging device may be further transmitted through in-band communication between the first electronic device and the wireless charging device. For example, the wireless charging device may send a Bluetooth MAC address to the first electronic device to perform Bluetooth automatic connection, and the user does not need to manually set pairing. For another example, the first electronic device sends a WiFi key or a Bluetooth MAC address to the wireless charging device to perform pairing. For another example, the first electronic device sends an operation instruction to the wireless charging device, for example, turning on an LED lamp.

It may be understood that, when the first electronic device is provided with the wireless charging device (the wireless charging device is an auxiliary device of the first electronic device and is physically connected to the first electronic device) and the wireless charging device is located between the first electronic device and a second electronic device, if a wireless charging transmission function of the first electronic device is enabled, and whether the wireless charging device has a wireless charging requirement is not determined, the receiver circuit of the wireless charging device receives the wireless power from the first electronic device. The first electronic device wirelessly charges the wireless charging device. If the second electronic device is placed on the first electronic device, the first electronic device termi-nates the wireless charging transmission function due to an ASK conflict and FOD protection between the wireless charging device and the second electronic device. However, in this embodiment of this application, whether the wireless charging device has a wireless charging requirement is determined, and the wireless charging receiving function of the receiver circuit of the wireless charging device is enabled when the wireless charging device has a wireless charging requirement. When the first electronic device charges the second electronic device or the second electronic device charges the first electronic device, that is, when the wireless charging device is not wirelessly charged, the wireless charging receiving function of the receiver circuit of the wireless charging device is in a disabled state. That is, when the first electronic device is provided with the wireless charging device, if the user wants to charge the second electronic device, the user places the second electronic device on the first electronic device. In this case, because the wireless charging device has no wireless charging require-ment, the wireless charging receiving function of the receiver circuit of the wireless charging device is in a disabled state. The wireless power transmitted by the first electronic device can be transparently transmitted to the second electronic device through the wireless charging device, so that the first electronic device can charge the second electronic device through the wireless charging device, without causing FOD protection and an ASK communication conflict. Therefore, the first electronic device can forward receive wireless charging from another elec-tronic device or reversely charge another electronic device without detaching the wireless charging device.

Optionally, after enabling the modulation function of the ASK modulation circuit, the wireless charging device may send data information such as a configuration to the first electronic device (for example, a power configuration, a device type, or voltage information). When the first elec-tronic device correctly receives the data information sent by the wireless charging device, the first electronic device wirelessly charges the wireless charging device. If the first electronic device does not correctly receive the data infor-mation sent by the wireless charging device, the first elec-tronic device may terminate the wireless charging transmis-sion function of the first electronic device. For example, when the second electronic device and the wireless charging device each send data information to the first electronic device, because an ASK communication conflict occurs between the second electronic device and the wireless charging device, the first electronic device cannot correctly receive the data information sent by the wireless charging device, and the first electronic device terminates the wireless charging transmission function of the first electronic device.

In this embodiment of this application, when the first electronic device charges the second electronic device or the second electronic device charges the first electronic device, the wireless charging receiving function of the receiver circuit of the wireless charging device is in a disabled state, and the wireless charging device enables the wireless charg-ing receiving function of the receiver circuit of the wireless charging device when determining that the wireless charging device has a wireless charging requirement. In addition, there is no magnetic material on the coil of the wireless charging device. Therefore, when the first electronic device charges the second electronic device or the second electronic device charges the first electronic device, the first electronic device can charge another electronic device through the wireless charging device, or receive wireless power from another electronic device through the wireless charging device for charging, without detaching the wireless charging device from the first electronic device and without causing a misoperation of FOD protection and an ASK communi-cation conflict. Therefore, in this embodiment of this appli-cation, the first electronic device can charge the wireless charging device, or charge the second electronic device through the wireless charging device, or receive power from the second electronic device through the wireless charging device. Therefore, the first electronic device can forward receive wireless charging from another electronic device or reversely charge another electronic device without detaching the wireless charging device from the first electronic device.

Figure 11:
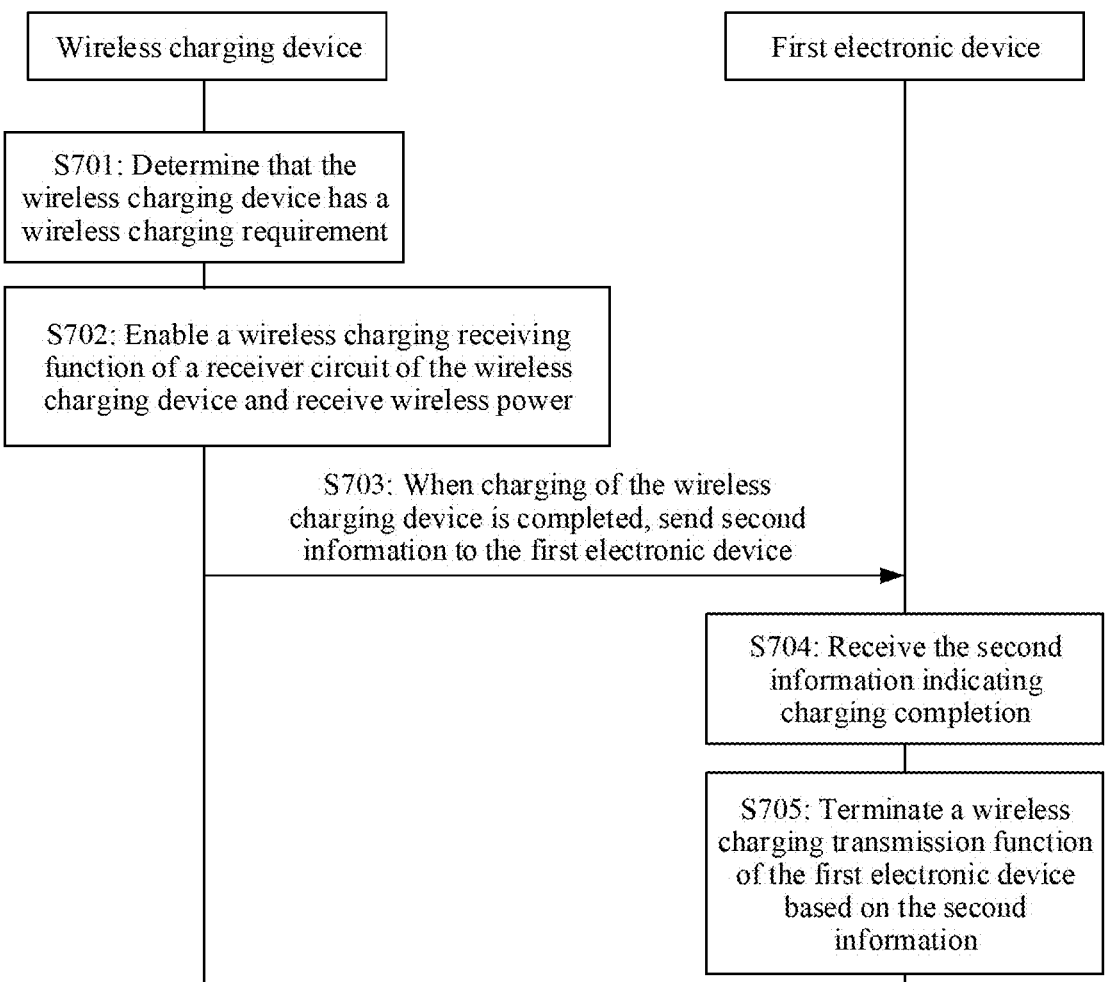
FIG. 11 is a schematic flowchart of another wireless charging method according to an embodiment of this application.

Optionally, an embodiment of this application further provides a wireless charging method. As shown in FIG. 11, after operation S702, operations S703 to S705 may be further included.

S703: When the charging of the wireless charging device is completed, the wireless charging device sends second information to the first electronic device.

The second information is used to indicate that the charging of the wireless charging device is completed. The second information may be charging complete indication information.

For example, after the charging of the wireless charging device is completed, the wireless charging device may transmit, to the first electronic device, the second informa-tion indicating that the charging of the wireless charging device is completed. For example, with reference to FIG. 8, after the charging of the wireless charging device 3200 (wireless charging device) is completed, the wireless charging device 3200 may send, to the first electronic device 3100 through ASK, second information indicating that the charging of the wireless charging device 3200 is completed.

S704: The first electronic device receives the second information.

S705: The first electronic device terminates a wireless charging transmission function of the first electronic device based on the second information.

For example, after learning that the charging of the wireless charging device is completed, the first electronic device may disable the wireless charging transmission function of the first electronic device. For example, with reference to FIG. 8, after a wireless charging transmission function of the first electronic device 3100 is disabled, the coil 3215 of the receiver circuit 3210 of the wireless charging device 3200 (wireless charging device) cannot receive the wireless power. Therefore, the wireless charging receiving function of the receiver circuit 3210 of the wireless charging device 3200 is in a disabled state. If the wireless receiving function of the receiver circuit 3210 of the wireless charging device 3200 needs to be enabled again, it may determine, by performing operation S701, whether the wireless charging device 3200 has a wireless charging requirement.

Optionally, an embodiment of this application further provides a wireless charging method. As shown in FIG. 12, after operation S702, operations S706 and S707 may be further included.

S706: When the charging of the wireless charging device is completed, the wireless charging device disables the wireless charging receiving function of the receiver circuit of the wireless charging device.

For example, with reference to FIG. 8, the disabling the wireless charging receiving function of the receiver circuit of the wireless charging device when the charging of the wireless charging device is completed includes: The wireless charging device 3200 opens the output switch 3219, and disables the modulation function of the ASK modulation circuit 3212.

For example, with reference to FIG. 9, the disabling the wireless charging receiving function of the receiver circuit of the wireless charging device when the charging of the wireless charging device is completed includes: The wireless charging device 4200 opens the first switch 4217.

S707: When the first electronic device does not correctly receive, within preset duration, data sent by a receive end device, the first electronic device terminates a wireless charging transmission function of the first electronic device.

For example, the receive end device includes the wireless charging device. That the first electronic device does not correctly receive, within preset duration, data sent by a receive end device includes: Because the receive end device disables a modulation function of an ASK communications circuit of the receive end device, the first electronic device cannot correctly receive the data sent by the receive end device. For example, after the charging of the wireless charging device is completed, the wireless charging device disables the modulation function of the ASK modulation circuit of the wireless charging device, that is, the wireless charging device does not send data to the first electronic device. In this case, the first electronic device cannot correctly receive the data sent by the receive end device, and the first electronic device may disable the wireless charging transmission function of the first electronic device.

Optionally, that the first electronic device does not correctly receive, within preset duration, data sent by a receive end device may alternatively include: Because an ASK communication conflict occurs between the first electronic device and the receive end device, the first electronic device cannot correctly receive the data sent by the receive end. For example, when the wireless charging device and another electronic device each send data to the first electronic device through ASK, the data sent by the wireless charging device and the data sent by the another electronic device are superimposed, and consequently the first electronic device cannot correctly receive the data sent by the wireless charging device and the another electronic device. The first electronic device may disable the wireless charging transmission function of the first electronic device.

Optionally, when a power level of the first electronic device is less than a preset threshold, the first electronic device may terminate the wireless charging transmission function of the first electronic device.

Figure 13:
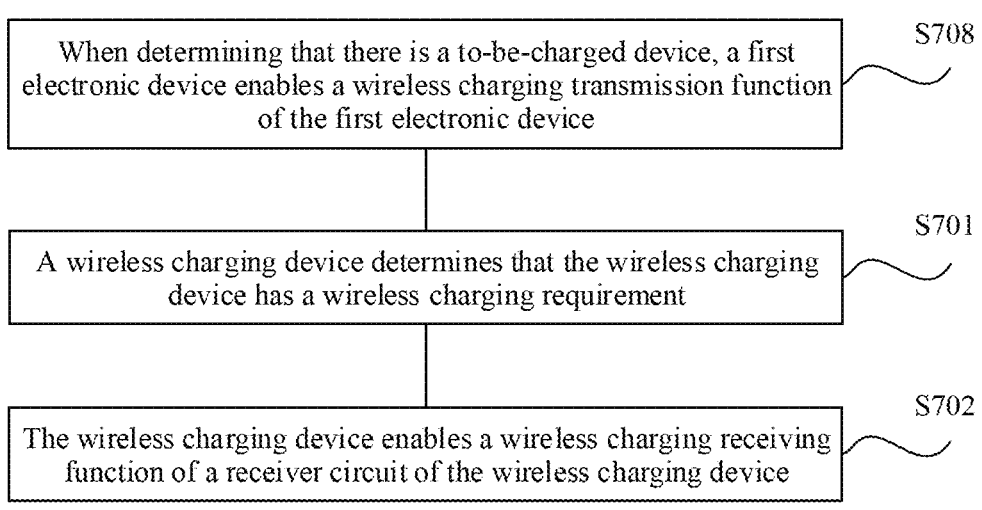
FIG. 13 is a schematic flowchart of another wireless charging method according to an embodiment of this application.

Optionally, an embodiment of this application further provides a wireless charging method. As shown in FIG. 13, before operation S701, operation S708 may be further included.

S708: When determining that there is a to-be-charged device, the first electronic device enables a wireless charging transmission function of the first electronic device.

For example, the first electronic device may enable the wireless charging transmission function of the first electronic device when detecting that there is a to-be-charged device, thereby avoiding an unnecessary power loss of the first electronic device.

For example, that the first electronic device determines that there is a to-be-charged device may include: The first electronic device determines, according to an instruction entered by a user or detection information of a sensor, that there is a to-be-charged device. For example, the first electronic device receives an instruction that is for charging a Bluetooth keyboard or the second electronic device and that is entered by the user in an application of the first electronic device (for example, the user taps an icon for charging the Bluetooth keyboard or the user taps an icon for charging the second electronic device), and determines that there is a to-be-charged device. For another example, the first electronic device may detect, by using a Hall effect sensor, that the Bluetooth keyboard is in a stand mode, and determine that there is a to-be-charged device. A specific implementation in which the first electronic device determines that there is a to-be-charged device is not limited in this embodiment of this application.

Optionally, the first electronic device may periodically enable the transmission function. When the to-be-charged device is placed on the first electronic device, the to-be-charged device sends data to the first electronic device, and the first electronic device switches from an intermittent transmission function enabling mode to a continuous mode. That is, the first electronic device continuously transmits power.

Optionally, when a power level of the wireless charging device is lower than a preset threshold, the first electronic device may enable the wireless charging transmission function of the first electronic device. For example, when the power level of the wireless charging device is lower than the preset threshold, the wireless charging device sends indication information to the first electronic device through a Bluetooth module, and the first electronic device enables the wireless charging transmission function of the first electronic device based on the indication information.

Figure 14:
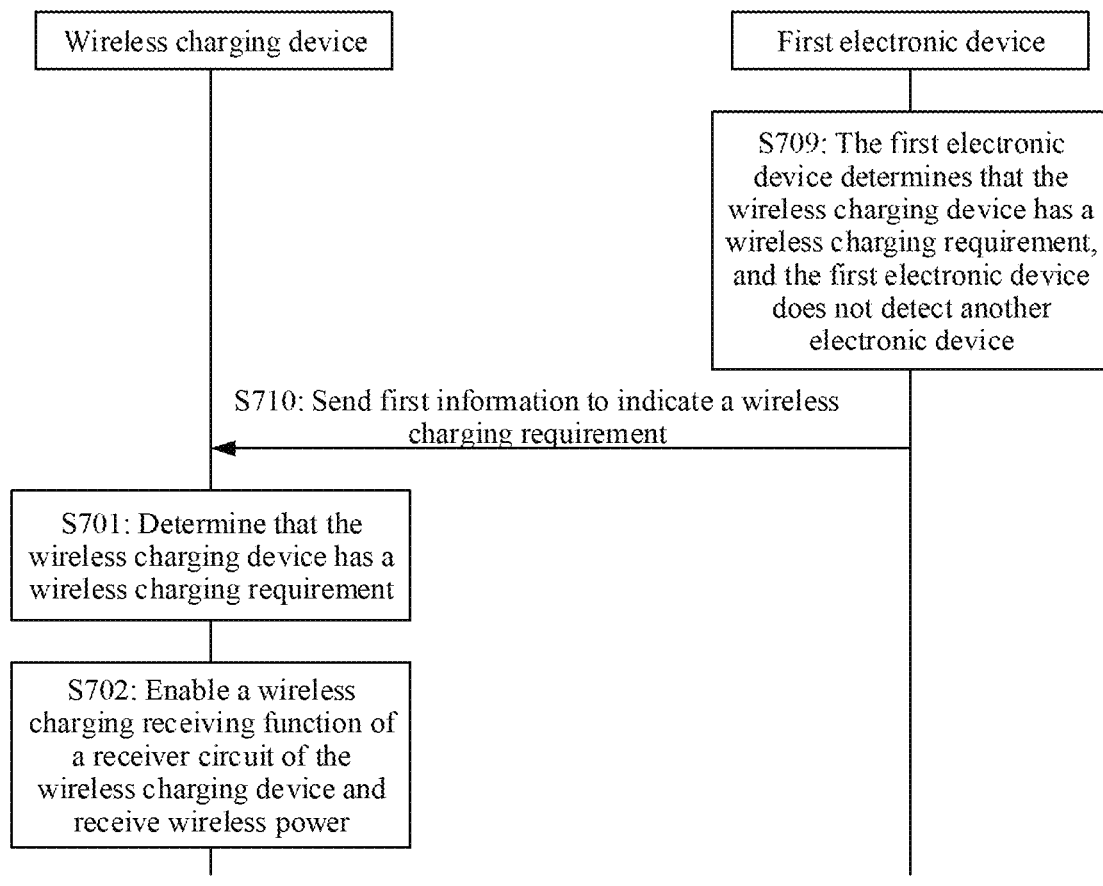
FIG. 14 is a schematic flowchart of another wireless charging method according to an embodiment of this application.

Optionally, an embodiment of this application further provides a wireless charging method. As shown in FIG. 14, before operation S701, operations S709 and S710 may be further included.

S709: The first electronic device determines that the wireless charging device has a wireless charging requirement, and the first electronic device does not detect the second electronic device.

For example, that the first electronic device determines that the wireless charging device has a wireless charging requirement may include: The first electronic device determines, based on an instruction entered by a user or detection information of a sensor, that the wireless charging device has a wireless charging requirement. For example, the first electronic device may receive the instruction entered by the user in the first electronic device, and determine that the wireless charging device has a wireless charging requirement. For another example, the first electronic device may detect, by using a Hall effect sensor, that a Bluetooth keyboard is in a stand mode, and determine that the wireless charging device has a wireless charging requirement.

For example, that the first electronic device determines that the wireless charging device has a wireless charging requirement may further include: The first electronic device receives a charging request from the wireless charging device, and determines that the wireless charging device has a wireless charging requirement. For example, when a power level of the wireless charging device is lower than a preset threshold, the wireless charging device sends the charging request to the first electronic device. After receiving the charging request, the first electronic device determines that the wireless charging device has a wireless charging requirement.

For example, that the first electronic device does not detect the second electronic device may include: The first electronic device determines that a wireless charging transmission function of the first electronic device is in a disabled state. Alternatively, after the first electronic device determines that a wireless charging transmission function of the first electronic device is in a disabled state, the first electronic device enables the wireless charging transmission function of the first electronic device, and if the first electronic device does not detect an ASK signal of the second electronic device within preset duration, the first electronic device may determine that the first electronic device does not detect the second electronic device.

S710: The first electronic device sends first information to the wireless charging device.

For example, the first electronic device may enable FSK to send the first information to the wireless charging device. The first information may be protocol data that is agreed on, and is used to indicate that the wireless charging device has a wireless charging requirement.

For example, after receiving the first information from the first electronic device, the wireless charging device enables a wireless receiving function of the receiver circuit of the wireless charging device, to provide power to a load.

It may be understood that, when the first electronic device charges another electronic device, if the wireless charging device determines that the wireless charging device has a wireless charging requirement, the wireless charging device enables the wireless charging receiving function of the receiver circuit of the wireless charging device. However, an ASK communication conflict and FOD protection occur between the wireless charging device and the another electronic device, and consequently wireless charging is interrupted because the wireless charging device forcibly joins.

In this embodiment, by performing operation S709, the first electronic device determines whether the wireless charging device has a wireless charging requirement. The first electronic device sends the first information to the wireless charging device when the first electronic device determines that the wireless charging device has a wireless charging requirement and the first electronic device does not detect another electronic device. After receiving the first information, the wireless charging device enables the wireless charging receiving function of the receiver circuit of the wireless charging device, thereby avoiding a problem that wireless charging is interrupted because the wireless charging device forcibly joins.

Figure 15:
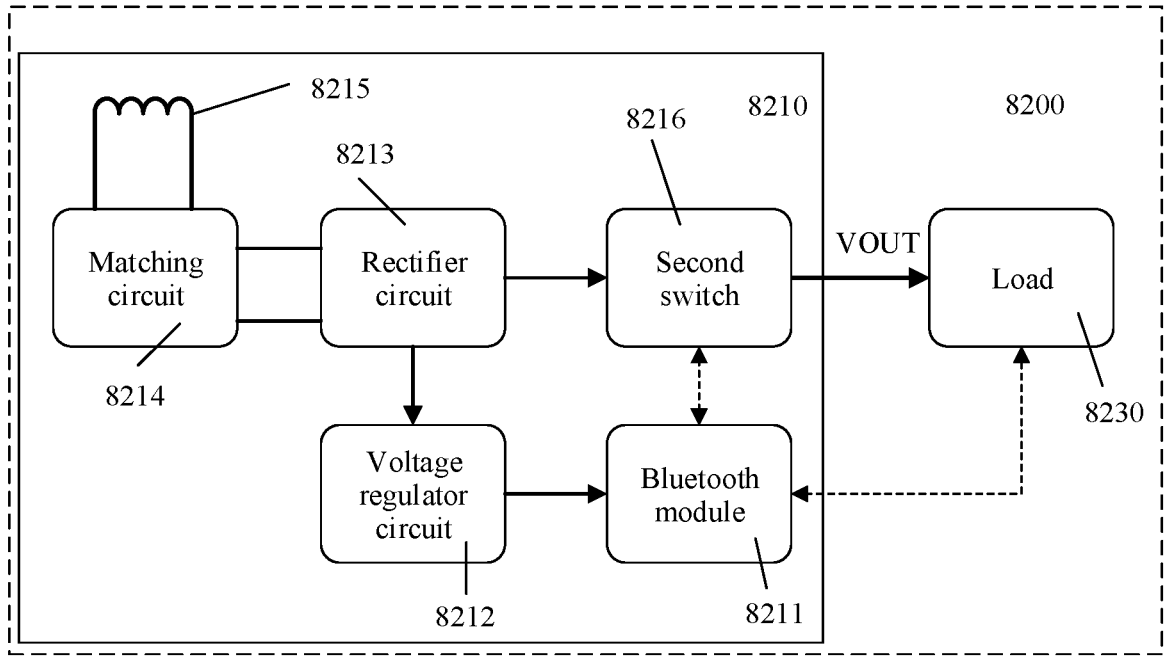
FIG. 15 is a schematic structural diagram of a wireless charging device according to an embodiment of this application.

An embodiment of this application further provides a wireless charging device. As shown in FIG. 15, the wireless charging device 8200 includes a receiver circuit 8210 and a load 8230, and the receiver circuit 8210 is configured to provide power to the load 8230. The receiver circuit 8210 includes a Bluetooth module 8211, a voltage regulator circuit 8212, a rectifier circuit 8213, a matching circuit 8214, a coil 8215, and a second switch 8216. One end of the second switch 8216 is connected to an output end of the rectifier circuit 8213, and the other end of the second switch 8216 is configured to connect to the load. The coil of the wireless charging device is located on an inner side of a housing of the wireless charging device, and there is no magnetic material on the coil of the wireless charging device. When a first electronic device charges a second electronic device or receives power from a second electronic device, the second switch is in an opened state. The second switch 8216 may be an active switch or a passive switch. For related descriptions about the second switch, refer to the first switch in the foregoing embodiment. Details are not described herein again.

An embodiment of this application further provides a wireless charging method, which is applied to the wireless charging device 8200 shown in FIG. 15. The wireless charging device is used together with a first electronic device. As shown in FIG. 16, the wireless charging method includes operations S1601 to S1606.

S1601: The first electronic device determines that the wireless charging device has a wireless charging requirement.

It may be understood that, for an example implementation of operation S1601, refer to operation S709. Details are not described herein again.

S1602: The first electronic device enables a wireless charging transmission function of the first electronic device.

S1603: The wireless charging device receives wireless power from the first electronic device.

Figure 17:
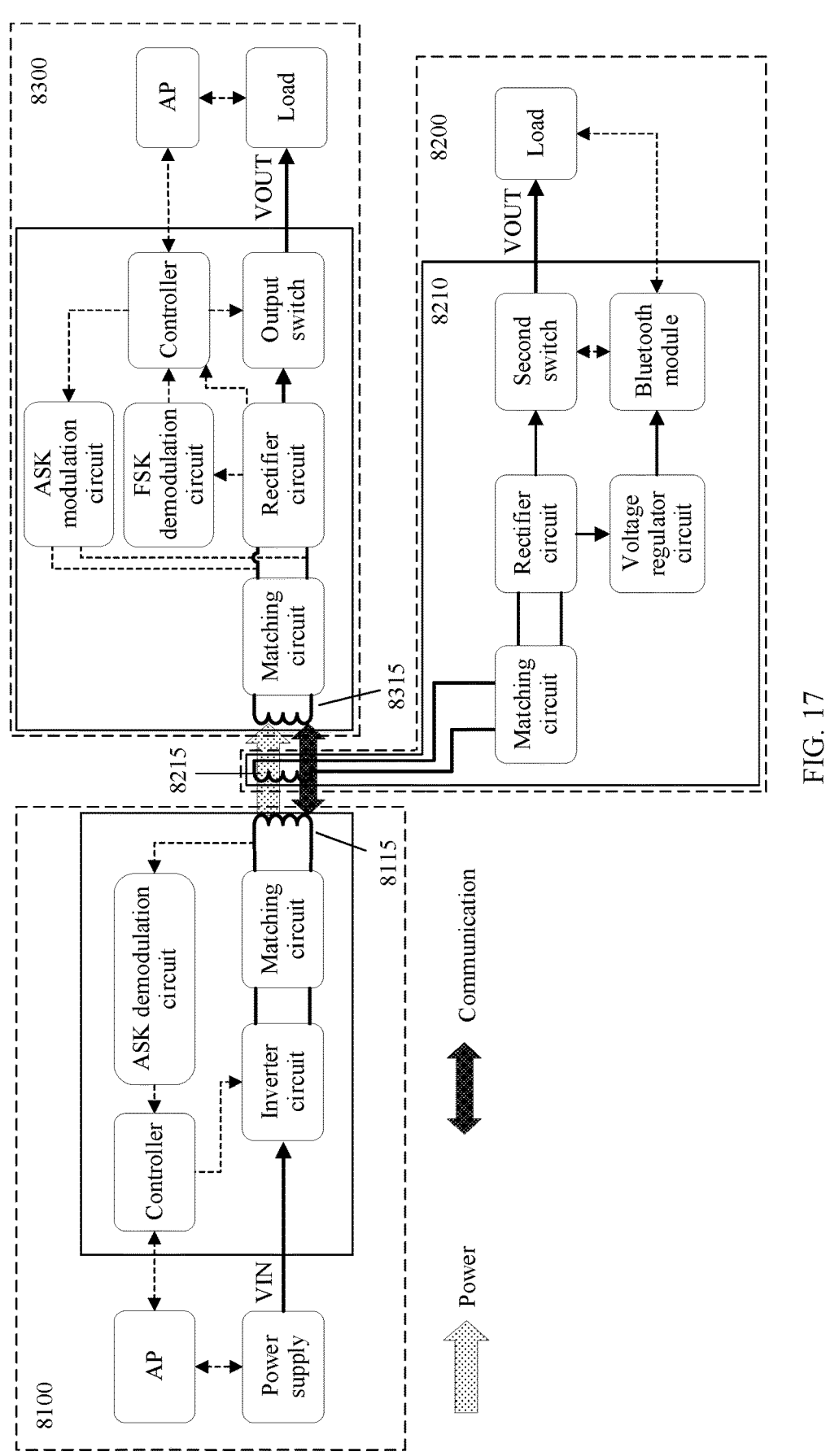
FIG. 17 is a schematic structural diagram of another wireless charging system according to an embodiment of this application.

For example, in a wireless charging system shown in FIG. 17, the wireless charging device 8200 is located between a first electronic device 8100 and a second electronic device 8300. After the first electronic device 8100 enables a wireless charging transmission function of the first electronic device 8100, the coil 8215 of the receiver circuit 8210 of the wireless charging device 8200 may induce wireless power generated by a coil 8115 of the first electronic device 8100. The matching circuit 8214, the rectifier circuit 8213, and the voltage regulator circuit 8212 may supply power to the Bluetooth module 8211.

It may be understood that, when the first electronic device 8100 shown in FIG. 17 charges the second electronic device 8300, the coil 8215 of the wireless charging device 8200 can induce the wireless power. However, because the second switch 8216 of the wireless charging device 8200 is in an opened state, no current is output to the load 8230. Therefore, the Bluetooth module 8211 of the wireless charging device 8200 remains to consume power at a very low rate. Therefore, FOD protection is not caused. In addition, because there is no magnetic material on the coil 8215 of the wireless charging device 8200, the wireless power transmitted by the first electronic device 8100 can be transparently transmitted to a coil 8315 of the second electronic device 8300 through the coil 8215 of the wireless charging device 8200. Therefore, the first electronic device 8100 can charge the second electronic device 8300 through the wireless charging device 8200 without detaching the wireless charging device 8200.

S1604: A Bluetooth module of the wireless charging device performs pairing with the first electronic device.

For example, with reference to FIG. 17, the Bluetooth module 8211 of the wireless charging device 8200 may perform pairing with the first electronic device.

S1605: When the Bluetooth module of the wireless charging device is successfully paired with the first electronic device, the Bluetooth module exchanges data with the first electronic device through Bluetooth communication.

For example, with reference to FIG. 17, when the Bluetooth module 8211 of the wireless charging device 8200 is successfully paired with the first electronic device 8100, the Bluetooth module 8211 exchanges data with the first electronic device 8100 through out-of-band communication, to implement closed-loop control of wireless charging.

For example, that the Bluetooth module exchanges data with the first electronic device through Bluetooth communication may include: The Bluetooth module receives a first instruction from the first electronic device, where the first instruction is used to instruct the Bluetooth module to enable a wireless charging receiving function of a receiver circuit of the Bluetooth module.

S1606: The Bluetooth module of the wireless charging device enables the wireless charging receiving function of the receiver circuit.

For example, with reference to FIG. 17, that the Bluetooth module of the wireless charging device enables the wireless charging receiving function of the receiver circuit includes: The Bluetooth module 8211 of the wireless charging device 8200 closes the second switch 8216, so that the receiver circuit 8210 of the wireless charging device 8200 can provide the induced wireless power to the load 8230.

Optionally, after operation S1606, if the wireless charging device sends, to the first electronic device, indication information indicating that charging of the wireless charging device is completed, or sends, to the first electronic device, information for requesting to stop wireless charging, the first electronic device may terminate the wireless charging transmission function of the first electronic device after receiving the information. Optionally, after operation S1606, if the first electronic device does not correctly receive, within preset duration, data sent by a receive end device, the first electronic device may alternatively terminate the wireless charging transmission function of the first electronic device.

It may be understood that this embodiment is different from the foregoing embodiment in that, in this embodiment, power transmission control is performed through out-of-band communication, and the wireless charging receiving function of the receiver circuit of the wireless charging device can be enabled when the first electronic device and the Bluetooth module of the wireless charging device are successfully paired. When the first electronic device charges the second electronic device or receives the power from the second electronic device, that is, when the wireless charging device is not wirelessly charged, the second switch is in an opened state. Therefore, the receiver circuit of the wireless charging device does not output a current to the load, and a misoperation of FOD protection is not caused. In addition, because there is no magnetic material on the coil of the wireless charging device, the wireless power transmitted by the first electronic device can be transparently transmitted to another electronic device through the coil of the wireless charging device, so that the first electronic device can charge the second electronic device through the wireless charging device, or receive the power from the second electronic device through the wireless charging device, without detaching the wireless charging device from the first electronic device. It may be understood that the receiver circuit of the wireless charging device in this embodiment does not include an ASK modulation circuit. Therefore, when the first electronic device charges the second electronic device or receives the power from the second electronic device, an ASK communication conflict does not occur between the wireless charging device and the second electronic device.

Figure 18A:
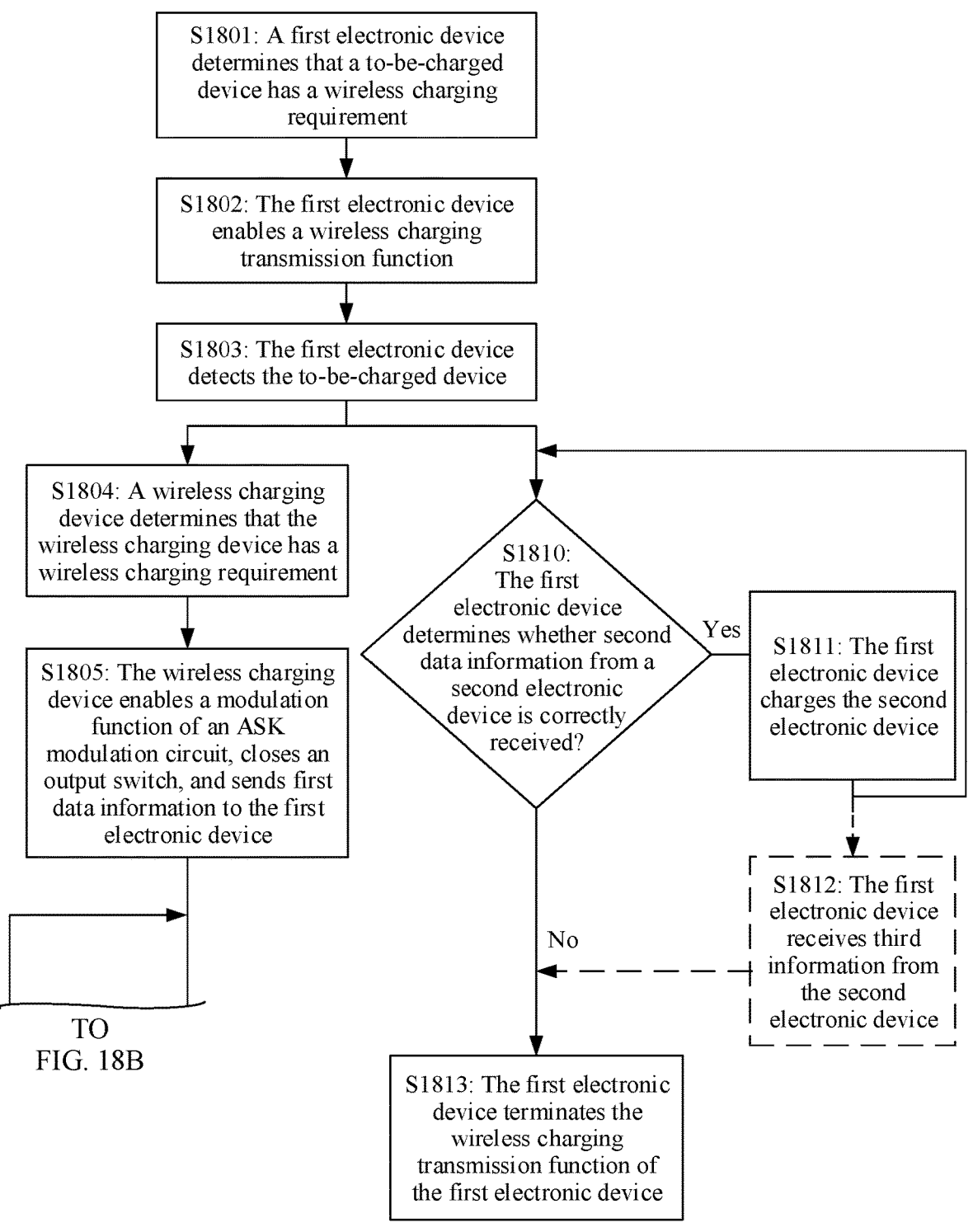
FIG. 18A and FIG. 18B are a schematic flowchart of another wireless charging method according to an embodiment of this application.
Figure 18B:
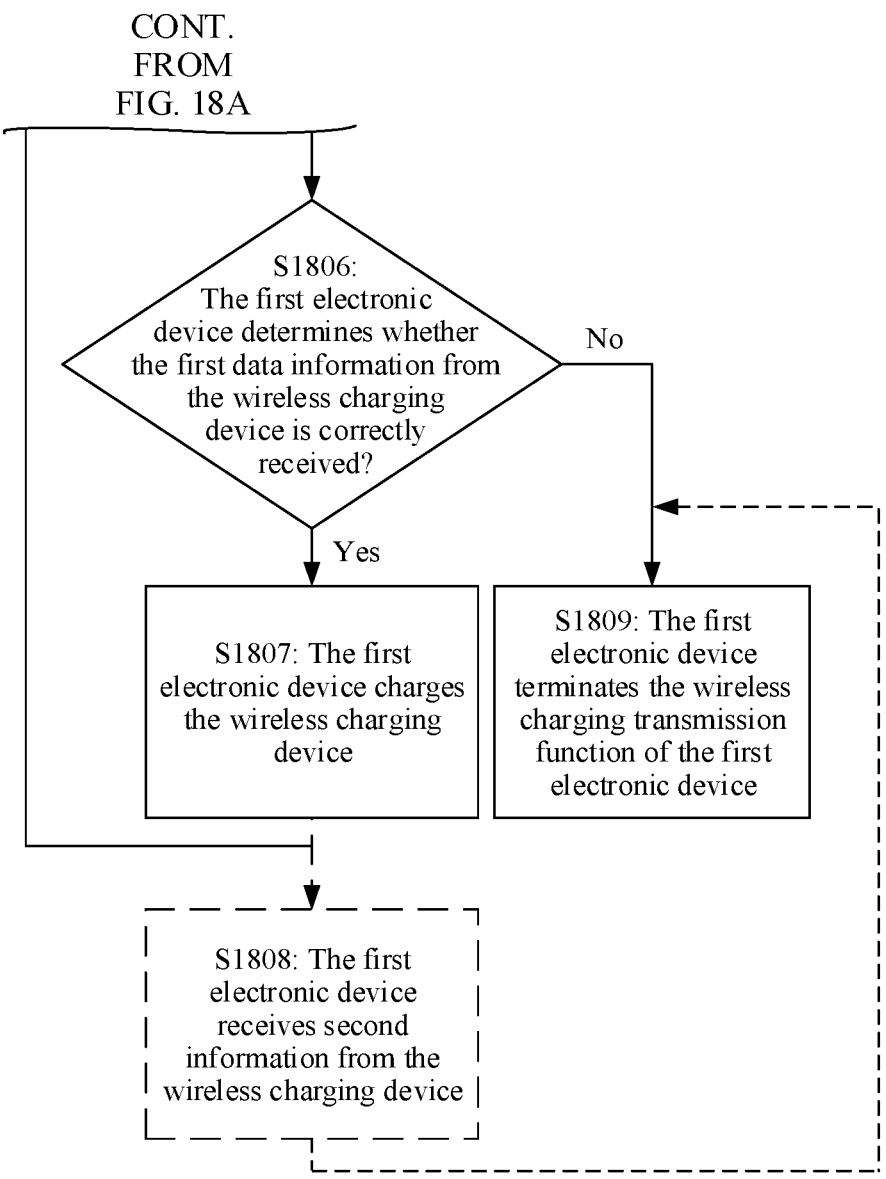

For example, an embodiment of this application further provides a wireless charging method. A circuit structure of a wireless charging device in the method is shown in the wireless charging device 3200 in FIG. 8. There is no magnetic material on the coil 3215 of the wireless charging device, and when the wireless charging device is not charged (a first electronic device charges a second electronic device or receives power from a second electronic device), the output switch 3219 is in an opened state, and a modulation function of the ASK modulation circuit 3212 is in a disabled state. As shown in FIG. 18A and FIG. 18B, the method includes operations S1801 to S1813.

S1801: The first electronic device determines that a to-be-charged device has a wireless charging requirement.

For example, the to-be-charged device may be the wireless charging device used together with the first electronic device, or may be another electronic device, for example, the second electronic device.

S1802: The first electronic device enables a wireless charging transmission function of the first electronic device.

For example, when determining that the to-be-charged device has a wireless charging requirement, the first electronic device enables the wireless charging transmission function of the first electronic device.

It may be understood that, for implementations of operations S1801 and S1802, refer to implementations of the foregoing operations. Details are not described herein again.

S1803: The first electronic device detects the to-be-charged device.

For example, that the first electronic device detects the to-be-charged device includes: The first electronic device detects parameters such as a device type, an identity, and a current change of the to-be-charged device.

When the first electronic device does not detect the to-be-charged device, the first electronic device terminates the wireless charging transmission function of the first electronic device. When the to-be-charged device is the wireless charging device, operations S1804 to S1809 continue to be performed. When the to-be-charged device is the second electronic device, operations S1810 to S1813 continue to be performed.

S1804: The wireless charging device determines that the wireless charging device has a wireless charging requirement.

It may be understood that the wireless charging device may determine, based on an instruction entered by a user and detection information of a sensor, whether the wireless charging device has a wireless charging requirement. When the wireless charging device determines that the wireless charging device has a wireless charging requirement, operation S1805 continues to be performed.

S1805: The wireless charging device enables the modulation function of the ASK modulation circuit, closes the output switch, and sends first data information to the first electronic device.

For example, the first data information includes information such as configuration information, a charging voltage (for example, a control error packet (CEP)), and charging power (for example, received power (RP)). The configuration information includes information such as a device type, a power level, an ID type, and coupling strength.

For example, after enabling the modulation function of the ASK modulation circuit, the wireless charging device may send the configuration information such as the power level, the device type, the ID type, and the coupling strength to the first electronic device. After the first electronic device starts charging the wireless charging device, the wireless charging device may send the information such as the charging voltage (for example, the CEP) and the charging power (for example, the RP) to the first electronic device.

For example, the wireless charging device closes the output switch, so that the receiver circuit of the wireless charging device can output power to the load.

S1806: The first electronic device determines whether the first data information from the wireless charging device is correctly received.

For example, that the first electronic device does not correctly receive the first data information from the wireless charging device includes: The first electronic device does not correctly receive the first data information from the wireless charging device because an ASK communication conflict occurs between the wireless charging device and another device. Alternatively, the first electronic device does not correctly receive the first data information from the wireless charging device because the wireless charging device disables the modulation function of the ASK modulation circuit of the wireless charging device.

If the first electronic device correctly receives the first data information from the wireless charging device, operations S1807 and S1808 continue to be performed. If the first electronic device does not correctly receive the first data information from the wireless charging device, operation S1809 continues to be performed.

S1807: The first electronic device charges the wireless charging device.

For example, in a process in which the first electronic device charges the wireless charging device, the first electronic device may continuously determine, by performing operation S1806, whether the first electronic device correctly receives the first data information from the wireless charging device.

(Optional) S1808: The first electronic device receives second information from the wireless charging device.

The second information is used to indicate that the charging of the wireless charging device is completed. The second information may be charging complete indication information.

For example, in a process of performing operations S1806 and S1807, if the first electronic device receives, from the wireless charging device, the second information indicating that the charging of the wireless charging device is completed, the first electronic device continues to perform operation S1809 of terminating the wireless charging transmission function of the first electronic device.

S1809: The first electronic device terminates the wireless charging transmission function of the first electronic device.

For example, when the first electronic device does not correctly receive the first data information from the wireless charging device, or when the first electronic device receives the charging complete indication information from the wireless charging device, the first electronic device terminates the wireless charging transmission function of the first electronic device.

S1810: The first electronic device determines whether second data information from the second electronic device is correctly received.

For content included in the second data information, refer to the first data information. Details are not described herein again.

For example, that the first electronic device does not correctly receive the second data information from the second electronic device includes: The first electronic device does not correctly receive the second data information from the second electronic device because an ASK communication conflict occurs between the second electronic device and another device. Alternatively, the first electronic device does not correctly receive the second data information from the second electronic device because the second electronic device disables an ASK modulation circuit of the second electronic device.

If the first electronic device correctly receives the second data information from the second electronic device, operations S1811 and S1812 continue to be performed. If the first electronic device does not correctly receive the second data information from the second electronic device, operation S1813 continues to be performed.

S1811: The first electronic device charges the second electronic device.

For example, in a process in which the first electronic device charges the second electronic device, the first electronic device may continuously determine, by performing operation S1810, whether the first electronic device correctly receives the second data information from the second electronic device.

(Optional) S1812: The first electronic device receives third information from the second electronic device.

The third information is used to indicate that the charging of the second electronic device is completed. The third information may be charging complete indication information.

For example, if the first electronic device receives, from the second electronic device, the third information indicating that the charging of the second electronic device is completed, the first electronic device continues to perform operation S1813 of terminating the wireless charging transmission function of the first electronic device.

It should be noted that, in a process in which the first electronic device charges the second electronic device, because the wireless charging device used together with the first electronic device does not perform wireless charging, the output switch of the receiver circuit of the wireless charging device is always in an opened state, and the modulation function of the ASK modulation circuit of the receiver circuit of the wireless charging device is always in a disabled state. In addition, there is no magnetic material on the coil of the wireless charging device. Therefore, when the first electronic device charges the second electronic device, the wireless power can be transparently transmitted to the second electronic device through the wireless charging device, without causing a misoperation of FOD protection and an ASK communication conflict.

S1813: The first electronic device terminates the wireless charging transmission function of the first electronic device.

It should be noted that a execution sequence of operations S1801 to S1813 is not limited in this embodiment of this application. FIG. 18A and FIG. 18B are merely an example of a flowchart of an execution sequence.

According to the wireless charging method provided in this embodiment of this application, when the first electronic device charges the second electronic device or the second electronic device charges the first electronic device, that is, when the wireless charging device is not wirelessly charged, the output switch of the wireless charging device is in an opened state, and the modulation function of the ASK modulation circuit the wireless charging device is in a disabled state. In addition, when determining that the wireless charging device has a wireless charging requirement, the wireless charging device closes the output switch, and enables the modulation function of the ASK modulation circuit. In addition, because there is no magnetic material on the coil of the wireless charging device, the wireless power transmitted by the first electronic device can be transparently transmitted to another electronic device through the coil of the wireless charging device. Therefore, the first electronic device can charge another electronic device or receive wireless power from another electronic device for charging, without detaching the wireless charging device from the first electronic device and without causing a misoperation of FOD protection and an ASK communication conflict.

Figure 19A:
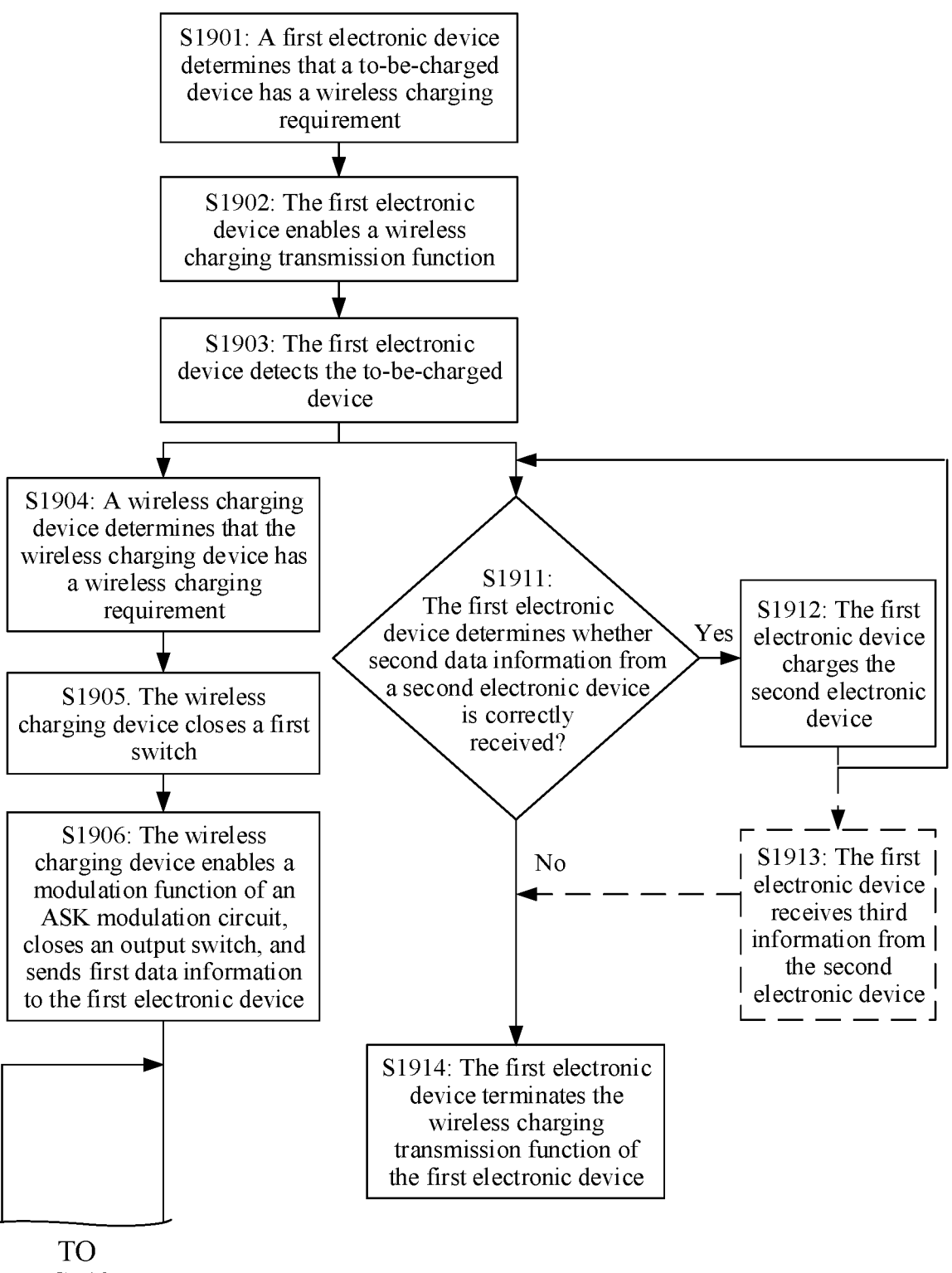
FIG. 19A and FIG. 19B are a schematic flowchart of another wireless charging method according to an embodiment of this application.
Figure 19B:
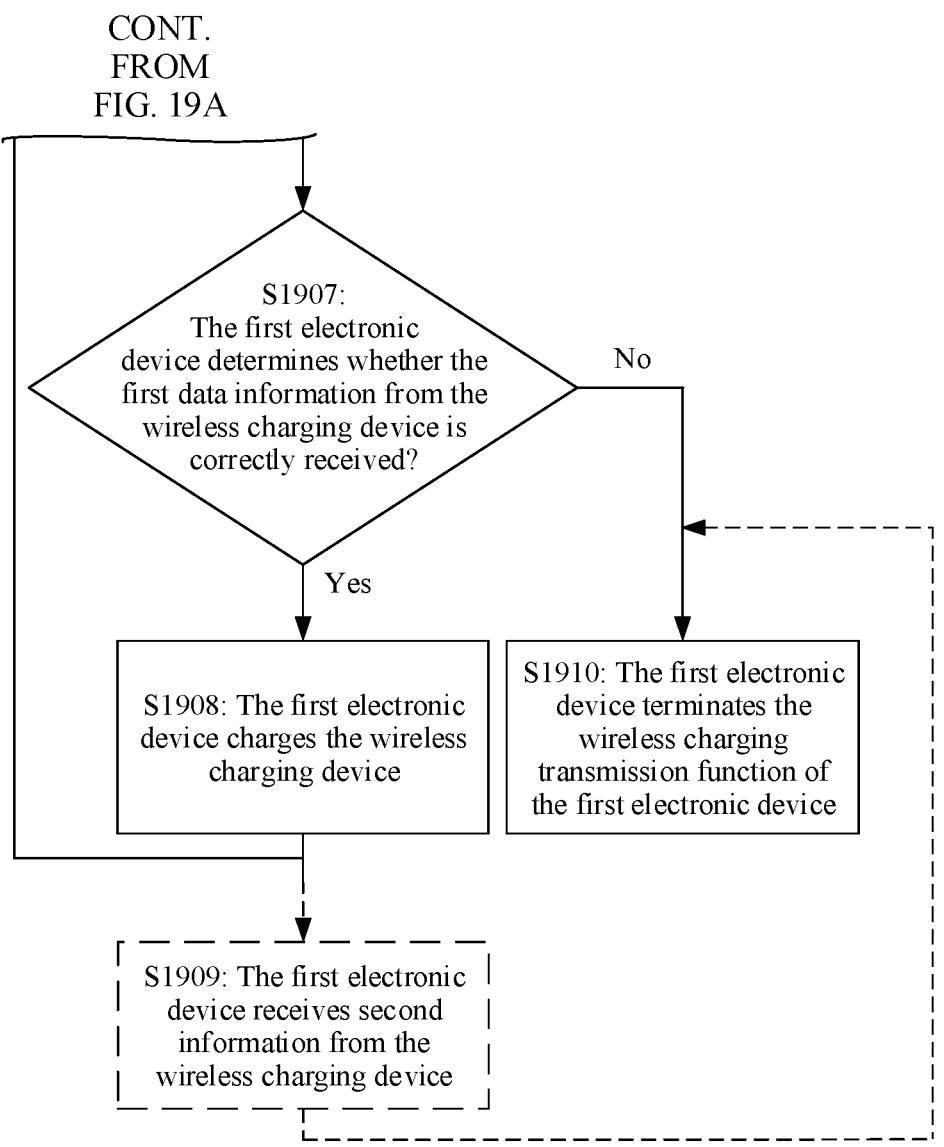

For example, an embodiment of this application further provides a wireless charging method. A circuit structure of a wireless charging device in the method is shown in the wireless charging device 4200 in FIG. 9. There is no magnetic material on the coil 4215 of the wireless charging device, and when the wireless charging device is not charged (a first electronic device charges a second electronic device or receives power from a second electronic device), the first switch 4217 is in an opened state. As shown in FIG. 19A and FIG. 19B, the method includes operations S1901 to S1914.

S1901: The first electronic device determines that a to-be-charged device has a wireless charging requirement.

S1902: The first electronic device enables a wireless charging transmission function of the first electronic device.

It may be understood that, for implementations of operations S1901 and S1902, refer to implementations of the foregoing operations. Details are not described herein again.

S1903: The first electronic device detects the to-be-charged device.

When the first electronic device does not detect the to-be-charged device, the first electronic device terminates the wireless charging transmission function of the first electronic device. When the to-be-charged device is the wireless charging device, operations S1904 to S1910 continue to be performed. When the to-be-charged device is the second electronic device, operations S1911 to S1914 continue to be performed.

S1904: The wireless charging device determines that the wireless charging device has a wireless charging requirement.

S1905: The wireless charging device closes the first switch.

For example, with reference to FIG. 9, after the wireless charging device closes the first switch, the coil of the wireless charging device may provide an induced current to the circuit module of the receiver circuit.

S1906: The wireless charging device enables the modulation function of the ASK modulation circuit, closes the output switch, and sends first data information to the first electronic device.

S1907: The first electronic device determines whether the first data information from the wireless charging device is correctly received.

It may be understood that, for implementations of operations S1906 and S1907, refer to operations S1805 and S1806. Details are not described herein again.

If the first electronic device correctly receives the first data information from the wireless charging device, operations S1908 and S1909 continue to be performed. If the first electronic device does not correctly receive the first data information from the wireless charging device, operation S1910 continues to be performed.

S1908: The first electronic device charges the wireless charging device.

For example, in a process in which the first electronic device charges the wireless charging device, the first electronic device may continuously determine, by performing operation S1907, whether the first electronic device correctly receives the first data information from the wireless charging device.

(Optional) S1909: The first electronic device receives second information from the wireless charging device.

The second information is used to indicate that the charging of the wireless charging device is completed. The second information may be charging complete indication information.

For example, in a process of performing operations S1907 and S1908, if the first electronic device receives, from the wireless charging device, the second information indicating that the charging of the wireless charging device is completed, the first electronic device continues to perform operation S1910 of terminating the wireless charging transmission function of the first electronic device.

S1910: The first electronic device terminates the wireless charging transmission function of the first electronic device.

For example, when the first electronic device does not correctly receive the first data information from the wireless charging device, or when the first electronic device receives the charging complete indication information from the wireless charging device, the first electronic device terminates the wireless charging transmission function of the first electronic device.

S1911: The first electronic device determines whether second data information from the second electronic device is correctly received.

If the first electronic device correctly receives the second data information from the second electronic device, operations S1912 and S1913 continue to be performed. If the first electronic device does not correctly receive the second data information from the second electronic device, operation S1914 continues to be performed.

S1912: The first electronic device charges the second electronic device.

For example, in a process in which the first electronic device charges the second electronic device, the first electronic device may continuously determine, by performing operation S1911, whether the first electronic device correctly receives the second data information from the second electronic device.

(Optional) S1913: The first electronic device receives third information from the second electronic device.

The third information is used to indicate that the charging of the second electronic device is completed. The third information may be charging complete indication information.

For example, if the first electronic device receives, from the second electronic device, the third information indicating that the charging of the wireless charging device is completed, the first electronic device continues to perform operation S1914 of terminating the wireless charging transmission function of the first electronic device.

It may be understood that, for implementations of operations S1911 to S1913, refer to operations S1810 to S1812. Details are not described herein again.

It should be noted that, in a process in which the first electronic device charges the second electronic device, because the wireless charging device used together with the first electronic device does not perform wireless charging, the first switch of the receiver circuit of the wireless charging device is always in an opened state. In addition, there is no magnetic material on the coil of the wireless charging device. Therefore, when the first electronic device charges the second electronic device, the wireless power can be transparently transmitted to the second electronic device through the wireless charging device, without causing a misoperation of FOD protection and an ASK communication conflict.

S1914: The first electronic device terminates the wireless charging transmission function of the first electronic device.

It should be noted that a execution sequence of operations S1901 to S1914 is not limited in this embodiment of this application. FIG. 19A and FIG. 19B are merely an example of a flowchart of an execution sequence.

According to the wireless charging method provided in this embodiment of this application, when the first electronic device charges the second electronic device or the second electronic device charges the first electronic device, that is, when the wireless charging device is not wirelessly charged, the first switch of the wireless charging device is in an opened state. In addition, when determining that the wireless charging device has a wireless charging requirement, the wireless charging device closes the first switch, closes the output switch, and enables the modulation function of the ASK modulation circuit. In addition, because there is no magnetic material on the coil of the wireless charging device, the wireless power transmitted by the first electronic device can be transparently transmitted to another electronic device through the coil of the wireless charging device. Therefore, the first electronic device can charge another electronic device or receive wireless power from another electronic device for charging, without detaching the wireless charging device from the first electronic device and without causing a misoperation of FOD protection and an ASK communication conflict.

Figure 20A:
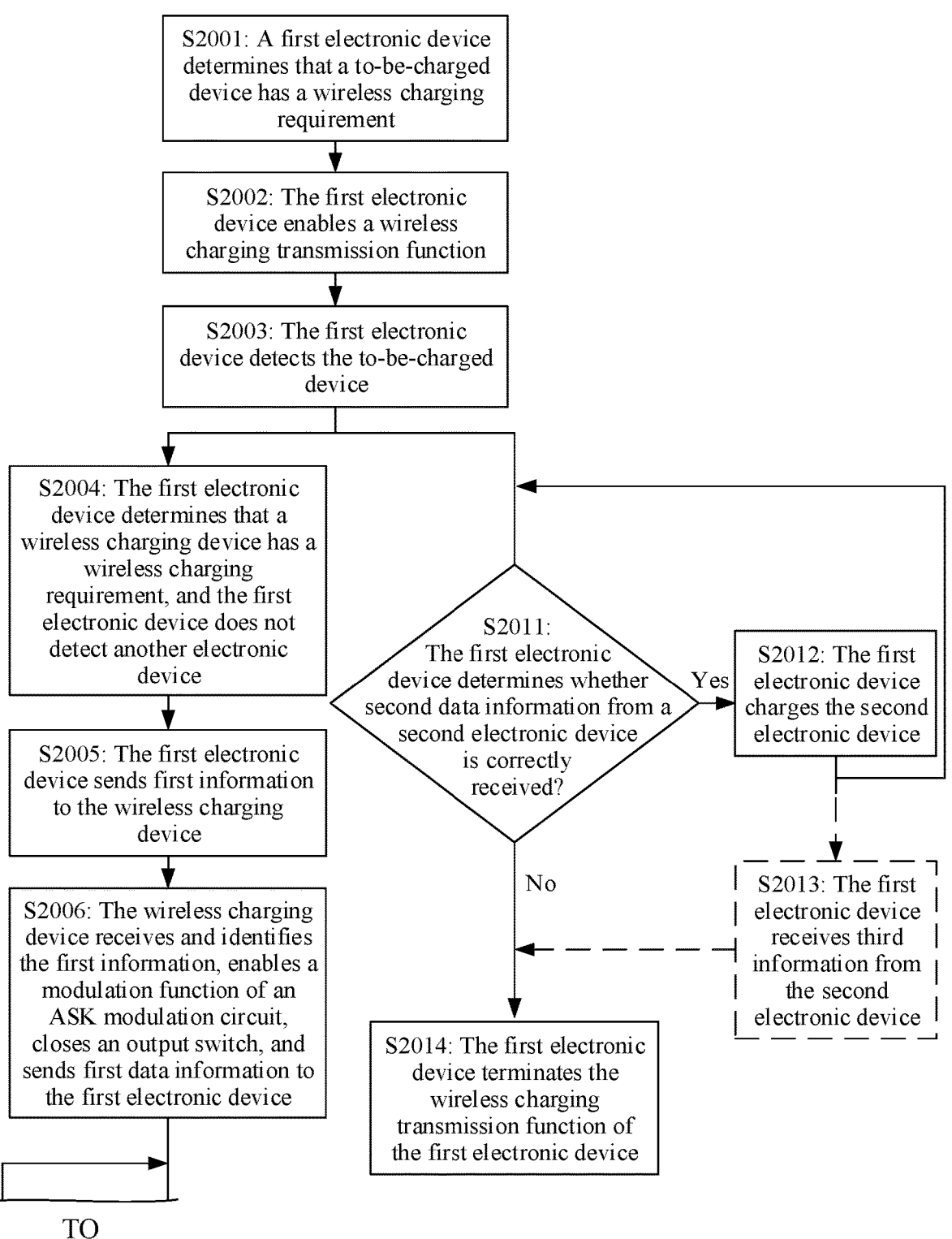
FIG. 20A and FIG. 20B are a schematic flowchart of another wireless charging method according to an embodiment of this application.
Figure 20B:
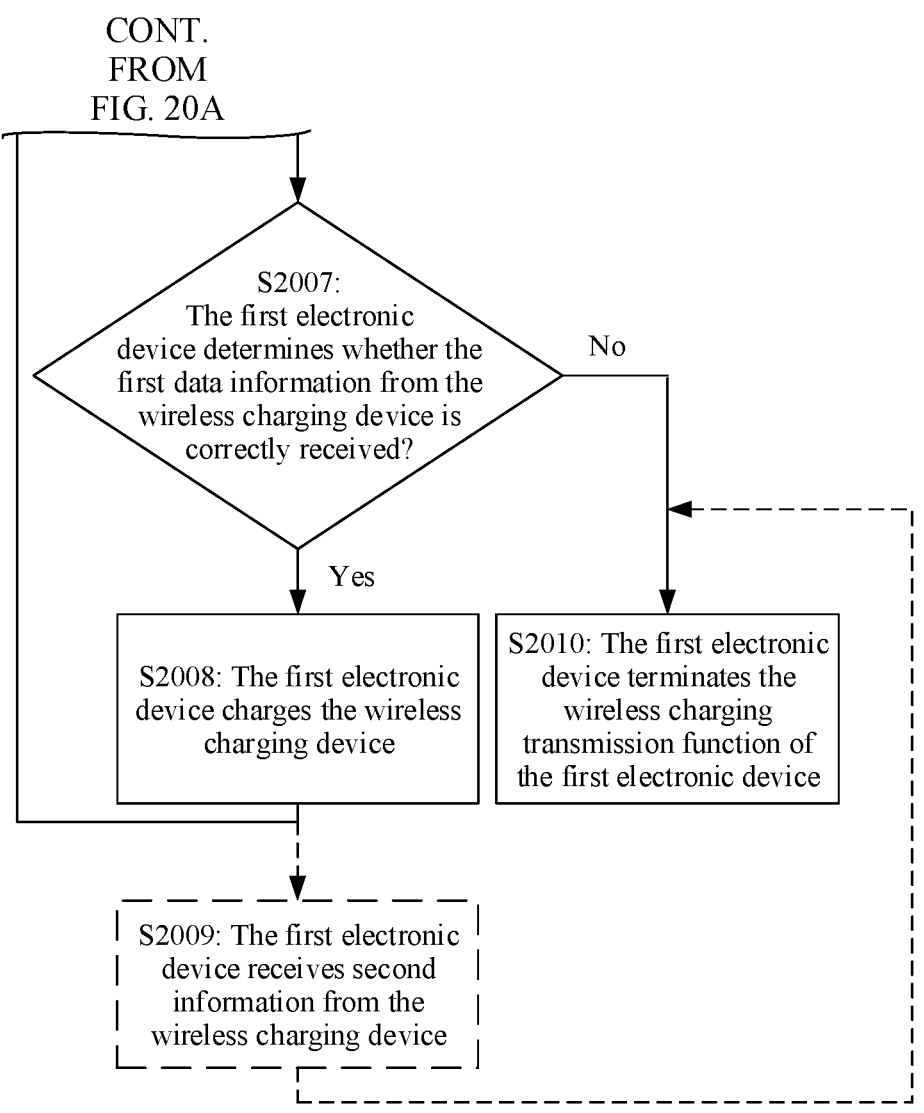

For example, an embodiment of this application further provides a wireless charging method. A circuit structure of a wireless charging device in the method is shown in the wireless charging device 3200 in FIG. 8. There is no magnetic material on the coil 3215 of the wireless charging device, and when the wireless charging device is not charged (a first electronic device charges a second electronic device or receives power from a second electronic device), the output switch 3219 is in an opened state, and a modulation function of the ASK modulation circuit 3212 is in a disabled state. As shown in FIG. 20A and FIG. 20B, the method includes operations S2001 to S2014.

S2001: The first electronic device determines that a to-be-charged device has a wireless charging requirement.

S2002: The first electronic device enables a wireless charging transmission function of the first electronic device.

It may be understood that, for implementations of operations S2001 and S2002, refer to implementations of the foregoing operations. Details are not described herein again.

S2003: The first electronic device detects the to-be-charged device.

When the first electronic device does not detect the to-be-charged device, the first electronic device terminates the wireless charging transmission function of the first electronic device. When the to-be-charged device is the wireless charging device, operations S2004 to S2010 continue to be performed. When the to-be-charged device is the second electronic device, operations S2011 to S2014 continue to be performed.

S2004: The first electronic device determines that the wireless charging device has a wireless charging requirement, and the first electronic device does not detect another electronic device.

S2005: The first electronic device sends first information to the wireless charging device.

For example, the first electronic device may enable FSK to send the first information to the wireless charging device. The first information may be protocol data that is agreed on, and is used to indicate that the wireless charging device has a wireless charging requirement.

S2006: The wireless charging device receives and identifies the first information, enables the modulation function of the ASK modulation circuit, closes the output switch, and sends first data information to the first electronic device.

S2007: The first electronic device determines whether the first data information from the wireless charging device is correctly received.

It may be understood that, for an example specific implementation of operation S2007, refer to operation S1806. Details are not described herein again.

If the first electronic device correctly receives the first data information from the wireless charging device, operation S2008 continues to be performed. If the first electronic device does not correctly receive the first data information from the wireless charging device, operation S2014 continues to be performed.

S2008: The first electronic device charges the wireless charging device.

(Optional) S2009: The first electronic device receives second information from the wireless charging device.

The second information is used to indicate that the charging of the wireless charging device is completed. The second information may be charging complete indication information.

For example, in a process of performing operations S2007 and S2008, if the first electronic device receives, from the wireless charging device, the second information indicating that the charging of the wireless charging device is completed, the first electronic device continues to perform operation S2010 of terminating the wireless charging transmission function of the first electronic device.

S2010: The first electronic device terminates the wireless charging transmission function of the first electronic device.

For example, when the first electronic device does not correctly receive the first data information from the wireless charging device, or when the first electronic device receives the charging complete indication information from the wireless charging device, the first electronic device terminates the wireless charging transmission function of the first electronic device.

S2011: The first electronic device determines whether second data information from the second electronic device is correctly received.

If the first electronic device correctly receives the second data information from the second electronic device, operations S2012 and S2013 continue to be performed. If the first electronic device does not correctly receive the second data information from the second electronic device, operation S2014 continues to be performed.

S2012: The first electronic device charges the second electronic device.

For example, in a process in which the first electronic device charges the second electronic device, the first electronic device may continuously determine, by performing operation S2011, whether the first electronic device correctly receives the second data information from the second electronic device.

(Optional) S2013: The first electronic device receives third information from the second electronic device.

The third information is used to indicate that the charging of the second electronic device is completed. The third information may be charging complete indication information.

For example, if the first electronic device receives, from the second electronic device, the third information indicating that the charging of the wireless charging device is completed, the first electronic device continues to perform operation S2014 of terminating the wireless charging transmission function of the first electronic device.

It may be understood that, for specific implementations of operations S2011 to S2013, refer to operations S1810 to S1812. Details are not described herein again.

It should be noted that, in a process in which the first electronic device charges the second electronic device, because the wireless charging device used together with the first electronic device does not perform wireless charging, the output switch of the receiver circuit of the wireless charging device is always in an opened state, and the modulation function of the ASK modulation circuit of the receiver circuit of the wireless charging device is always in a disabled state. In addition, there is no magnetic material on the coil of the wireless charging device. Therefore, when the first electronic device charges the second electronic device, the wireless power can be transparently transmitted to the second electronic device through the wireless charging device, without causing a misoperation of FOD protection and an ASK communication conflict.

S2014: The first electronic device terminates the wireless charging transmission function of the first electronic device.

It should be noted that an execution sequence of operations S2001 to S2014 is not limited in this embodiment of this application. FIG. 20A and FIG. 20B are merely an example of a flowchart of an execution sequence.

According to the wireless charging method provided in this embodiment of this application, when the first electronic device charges the second electronic device or receives the power from the second electronic device, that is, when the wireless charging device is not wirelessly charged, the output switch of the wireless charging device is in an opened state, and the modulation function of the ASK modulation circuit the wireless charging device is in a disabled state. In addition, when determining that the wireless charging device has a wireless charging requirement, the wireless charging device closes the output switch, and enables the modulation function of the ASK modulation circuit. In addition, because there is no magnetic material on the coil of the wireless charging device, the wireless power transmitted by the first electronic device can be transparently transmitted to another electronic device through the coil of the wireless charging device. Therefore, the first electronic device can charge another electronic device or receive wireless power from another electronic device for charging, without detaching the wireless charging device from the first electronic device and without causing a misoperation of FOD protection and an ASK communication conflict.

Figure 21:
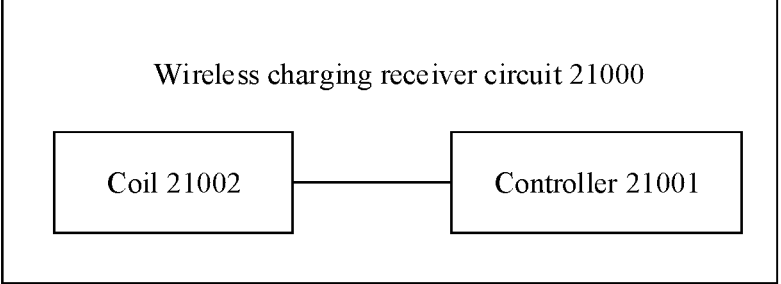
FIG. 21 is a schematic diagram of composition of a wireless charging receiver circuit according to an embodiment of this application.

FIG. 21 shows a wireless charging receiver circuit 21000 according to an embodiment of this application. The wireless charging receiver circuit 21000 may be applied to a wireless charging device. The wireless charging device is an auxiliary device of a first electronic device and is physically connected to the first electronic device. The wireless charging receiver circuit 21000 includes a controller 21001 and a coil 21002. The coil 21002 is located on an inner side of a housing of the wireless charging device. There is no magnetic material between the coil 21002 and the inside of the housing of the wireless charging device, or an area of a magnetic material between the coil 21002 and the inner side of the housing of the wireless charging device is less than a preset threshold. When the first electronic device charges a second electronic device or receives power from a second electronic device, a wireless charging receiving function of the wireless charging receiver circuit 21000 is in a disabled state. The coil 21002 is configured to induce an external magnetic field and generate an induced current. The controller 21001 is configured to determine that the wireless charging device has a wireless charging requirement. The controller 21001 is further configured to enable the wireless charging receiving function of the receiver circuit based on the wireless charging requirement.

For example, the wireless charging receiver circuit 21000 may further include an output switch and an ASK modulation circuit. The controller is specifically configured to: enable a modulation function of the ASK modulation circuit, and close the output switch based on the wireless charging requirement.

Optionally, the wireless charging receiver circuit 21000 may further include one or more first switches, a matching circuit, and a rectifier circuit. Two ends of the coil 21002 are connected to an input end of the matching circuit, and an output end of the matching circuit is connected to an input end of the rectifier circuit. The one or more first switches may be disposed between the coil 21002 and the matching circuit and/or between the matching circuit and the input end of the rectifier circuit.

For example, the controller is further specifically configured to: close the one or more first switches, enable the modulation function of the ASK modulation circuit, and close the output switch based on the wireless charging requirement.

It may be understood that the controller 21001 may be configured to perform the wireless charging method in any one of the embodiments in FIG. 7, FIG. 11, FIG. 12, FIG. 13, FIG. 14, FIG. 16, FIG. 18A and FIG. 18B, FIG. 19A and FIG. 19B, and FIG. 20A and FIG. 20B.

An embodiment of this application further provides a wireless charging apparatus. The wireless charging apparatus includes a charging management chip and the wireless charging receiver circuit 21000.

An embodiment of this application further provides a wireless charging system. The wireless charging system includes a first electronic device, a wireless charging device, and a second electronic device. The wireless charging device is located between the first electronic device and the second electronic device. The wireless charging device is an auxiliary device of the first electronic device and is physically connected to the first electronic device. The first electronic device is configured to: charge the wireless charging device, charge the second electronic device through the wireless charging device, and receive power from the second electronic device through the wireless charging device. The wireless charging device includes the wireless charging receiver circuit 21000 shown in FIG. 21.

It may be understood that to implement the foregoing functions, the terminal device includes corresponding hardware structures and/or software modules for performing the functions. A person skilled in the art should be easily aware that, in combination with modules and algorithm operations of the examples described in the embodiments disclosed in this specification, this application may be implemented by a combination of hardware and computer software. A person skilled in the art may use different methods to implement the described functions for each particular application, but it should not be considered that the implementation goes beyond the scope of this application.

The method or algorithm operations described with reference to the content disclosed in this application may be implemented by hardware, or may be implemented by a processor by executing software instructions. The software instructions may include a corresponding software module. The software module may be stored in a random access memory (RAM), a flash memory, an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may be a component of the processor. The processor and the storage medium may be located in an ASIC. In addition, the ASIC may be located in a core network interface device. Certainly, the processor and the storage medium may alternatively exist as discrete components in a core network interface device.

A person skilled in the art should be aware that in the foregoing one or more examples, functions described in the present disclosure may be implemented by hardware, software, firmware, or any combination thereof. When the functions are implemented by software, the functions may be stored in a computer-readable medium or transmitted as one or more instructions or code in a computer-readable medium. The computer-readable medium includes a computer-readable storage medium and a communications medium. The communications medium includes any medium that facilitates transmission of a computer program from one place to another. The storage medium may be any available medium accessible to a general-purpose computer or a dedicated computer.

The objectives, technical solutions, and benefits of the present disclosure are further described in detail in the foregoing implementations. It should be understood that the foregoing descriptions are merely implementations of the present disclosure, but are not intended to limit the protection scope of the present disclosure. Any modification, equivalent replacement, or improvement made based on the technical solution of the present disclosure shall fall within the protection scope of the present disclosure.

What is claimed is:

1. A wireless charging apparatus, comprising:
a receiver circuit having a receiver coil; and
a housing enclosing the receiver circuit, wherein the receiver coil of the receiver circuit located on an inner side of the housing;
a controller configured to determine whether the wireless charging apparatus has a wireless charging requirement, wherein the wireless charging apparatus configured to be positioned between a first electronic device and a second electronic device, the wireless charging apparatus is physically connected to the first electronic device and extends functions of the first electronic device as an auxiliary device used together with the first electronic device; and
upon determining that the wireless charging apparatus has the wireless charging requirement, to enable
the receiver circuit to receive wireless power, via the receiver coil, from the first electronic device or the second electronic device; and
upon determining that the wireless charging apparatus does not have the wireless charging requirement, to receive an electromagnetic field to be transparently transmitted between the first electronic device and the second electronic device, through the receiver coil.

2. The wireless charging apparatus according to claim 1, wherein the receiver coil and the inner side of the housing are free from substantial magnetic material therebetween as measured by an area of a magnetic material compared to a preset area threshold.

3. The wireless charging apparatus according to claim 1, wherein when the first electronic device is configured to the second electronic device through the receiver coils, or is configured to receive a reverse charging from the second electronic device through the receiver coils, wherein the receiver circuit is operating with a wireless charging receiving function being in a disabled state.

4. The wireless charging apparatus according to claim 3, wherein the receiver circuit further comprises an output switch and an amplitude-shift keying (ASK) modulation circuit; and
when the wireless charging receiving function of the receiver circuit is in a disabled state, both the output switch and the ASK modulation circuit are in an open state; or
when the wireless charging receiving function of the receiver circuit is in an enabled state, both the output switch and the ASK modulation circuit are in a closed state.

5. The wireless charging apparatus according to claim 4, wherein the receiver circuit further comprises one or more first switches, a matching circuit, and a rectifier circuit, wherein at least one of the one or more first switches is located between the matching circuit and the rectifier circuit.

6. The wireless charging apparatus according to claim 1, wherein a self-resonant frequency of the wireless charging apparatus is greater than a maximum working frequency at which the first electronic device charges the second electronic device or receives wireless power from the second electronic device.

7. The wireless charging apparatus according to claim 4, wherein the controller is configured to receive a wireless charging requirement, and the controller and/or an application processor (AP) of the wireless charging apparatus are configured to control both the output switch and the ASK modulation circuit to be in a closed state for receiving the wireless power.

8. The wireless charging apparatus according to claim 7, wherein after charging of the wireless charging apparatus is completed, the controller is configured to: control the ASK modulation circuit to send, to the first electronic device, information indicating that the charging is completed, and control the ASK modulation circuit and the output switch to switch from a closed state to an opened state.

9. The wireless charging apparatus according to claim 5, wherein the controller is configured to receive a wireless charging requirement, and the controller and/or a processor of the wireless charging apparatus are configured to control the one or more first switches, the output switch, and the ASK modulation circuit to be in a closed state.

10. The wireless charging apparatus according to claim 9, wherein after charging of the wireless charging apparatus is completed, the controller is configured to: control the ASK modulation circuit to send, to the first electronic device, information indicating that the charging is completed, and control the one or more first switches, the ASK modulation circuit, and the output switch to switch from a closed state to an opened state.

11. The wireless charging apparatus according to claim 1, wherein the first electronic device is a tablet, and the wireless charging apparatus is a keyboard physically connected to the tablet and receives power from the tablet wirelessly.

12. A wireless charging system, comprising:
a first electronic device;
a second electronic device configured to transfer power wirelessly with the first electronic device; and
a wireless charging device physically connected to the first electronic device and positioned between the first electronic device and the second electronic device, the wireless charging device comprising:
a housing;
a receiver circuit enclosed by the housing, the receiver circuit including a receiver coil located on an inner side of the housing; and
a controller configured to determine whether the wireless charging device has a wireless charging requirement, and
upon determining that the wireless charging device has the wireless charging requirement, to enable the receiver circuit to receive wireless power, via the receiver coil, from the first electronic device or the second electronic device; and
upon determining that the wireless charging device does not have the wireless charging requirement, to receive an electromagnetic field to be transparently transmitted between the first electronic device and the second electronic device, through the receiver coil.

13. The system according to claim 12, wherein when the first electronic device charges the second electronic device or receives the power from the second electronic device, an electromagnetic field between the first electronic device and the second electronic device penetrates the wireless charging device.

14. The system according to claim 12, wherein the wireless charging device is free from a substantial magnetic material between the receiver coil and the inner side of the housing such that an area of the magnetic material is less than a preset threshold.

15. The system according to claim 12, wherein
when the first electronic device charges the second electronic device or receives the power from the second electronic device, a wireless charging receiving function of the receiver circuit is in a disabled state; or
when the first electronic device charges the wireless charging device, a wireless charging receiving function of the receiver circuit is in an enabled state.

16. The system according to claim 15, wherein the receiver circuit further comprises an output switch and an amplitude shift keying (ASK) modulation circuit; and
when the wireless charging receiving function of the receiver circuit is in a disabled state, both the output switch and the ASK modulation circuit are in an opened state; or
when the wireless charging receiving function of the receiver circuit is in an enabled state, both the output switch and the ASK modulation circuit are in a closed state.

17. The system according to claim 16, wherein
the wireless charging device is specifically configured to determine, according to an instruction entered by a user or detection information of a sensor, that the wireless charging device has a wireless charging requirement; or
the wireless charging device is specifically configured to: receive first information from the first electronic device, and determine, based on the first information, that the wireless charging device has a wireless charging requirement, wherein the first information is used to indicate that the wireless charging device has a wireless charging requirement.

18. The system according to claim 17, wherein
when the wireless charging device has a wireless charging requirement, both the output switch and the ASK modulation circuit are in a closed state.

19. The system according to claim 16, wherein
the wireless charging device is further configured to: when the charging of the wireless charging device is completed, send second information to the first electronic device, wherein the second information is used to indicate that the charging of the wireless charging device is completed; and
the wireless charging device is further configured to: after sending the second information, disable a modulation function of the ASK modulation circuit, and open the output switch.

20. The system according to claim 15, wherein the receiver circuit further comprises one or more first switches, a matching circuit, and a rectifier circuit; two ends of the receiver coil are connected to an input end of the matching circuit, and an output end of the matching circuit is connected to an input end of the rectifier circuit; and the one or more first switches are disposed between the receiver coil and the matching circuit or between the matching circuit and the input end of the rectifier circuit; and
when the wireless charging receiving function of the receiver circuit is in a disabled state, the one or more first switches are in an opened state; or
when the wireless charging receiving function of the receiver circuit is in an enabled state, the one or more first switches are in a closed state.

* * * * *